US009959706B2

(12) United States Patent
Mavroudis et al.

(10) Patent No.: US 9,959,706 B2
(45) Date of Patent: May 1, 2018

(54) SPECIFICALLY PROGRAMMED GAME-OPERATING COMPUTER SYSTEMS FOR CONDUCTING GAMES HAVING A COMMON JACKPOT AND COMPUTER-IMPLEMENTED METHODS OF USE THEREOF

(71) Applicant: Intralot S.A.—Integrated Lottery Systems and Services, Athens (GR)

(72) Inventors: Fotios Mavroudis, Athens (GR);
Gianna Karra, Athens (GR);
Panagiotis Koustenis, Athens (GR);
Ermioni Karra, Athens (GR);
Dionysios Antonopoulos, Athens (GR);
Constantina Tsintila, Athens (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 67 days.

(21) Appl. No.: 14/990,706

(22) Filed: Jan. 7, 2016

(65) Prior Publication Data
US 2016/0196724 A1    Jul. 7, 2016

Related U.S. Application Data

(60) Provisional application No. 62/100,794, filed on Jan. 7, 2015.

(51) Int. Cl.
*G07F 17/32*   (2006.01)
*G06Q 30/02*   (2012.01)
*G06Q 50/34*   (2012.01)

(52) U.S. Cl.
CPC ..... *G07F 17/3258* (2013.01); *G06Q 30/0283* (2013.01); *G06Q 50/34* (2013.01);
(Continued)

(58) Field of Classification Search
USPC ........................................... 463/16–25
See application file for complete search history.

(56) References Cited

U.S. PATENT DOCUMENTS 9,623,321 B2 *  4/2017  Smith ................. G07F 17/3258
9,626,826 B2 *  4/2017  Nguyen .............. G07F 17/3218
(Continued)

FOREIGN PATENT DOCUMENTS

WO     99/026204 A1    5/1999
WO     13/128296 A1    9/2013

OTHER PUBLICATIONS

International Search Report and Written Opinion from International Application No. PCT/IB2016/000423 dated Jun. 8, 2016.

*Primary Examiner* — Ronald Laneau

(74) *Attorney, Agent, or Firm* — Greenberg Traurig, LLP

(57) ABSTRACT

In some embodiments, the present invention provides for a specifically programmed game operating computer system which, when executing the particular program code, is configured to operate in real-time a game based, at least in part, on: electronically receiving, in real-time, via a computer network, game entries data representing game entries for playing the game which has a common jackpot or shares the common jackpot with another game, where the common jackpot is configured to be calculated, in real-time during game entry submission, based on the game having a plurality of options within at least one of the following parameters: a price point per game entry, a payout level, a prize structure, a common jackpot contribution collection, and a prize distribution mechanism.

14 Claims, 25 Drawing Sheets

(52) U.S. Cl.
CPC ............ *G07F 17/32* (2013.01); *G07F 17/329* (2013.01); *G07F 17/3211* (2013.01); *G07F 17/3225* (2013.01); *G07F 17/3272* (2013.01)

(56) References Cited

U.S. PATENT DOCUMENTS

| | | |
|---|---|---|
| 2005/0176490 A1 | 8/2005 | Wright |
| 2009/0221342 A1 | 9/2009 | Katz et al. |
| 2009/0275410 A1* | 11/2009 | Kisenwether .......... G06Q 10/00 463/42 |
| 2012/0231867 A1 | 9/2012 | Dimitriadis et al. |
| 2013/0084935 A1 | 4/2013 | DePaul et al. |
| 2013/0237312 A1 | 9/2013 | Palmisano |
| 2015/0269813 A1* | 9/2015 | Severance ............... G06Q 40/04 463/9 |
| 2016/0343198 A1* | 11/2016 | Karra ................... G07F 17/329 |

* cited by examiner

| PLAYERS CHOICE GAME | N = available | 49 |
|---|---|---|
| | k = drawn | 6 |

| Columns | 1 | 2 | 5 | |
|---|---|---|---|---|
| Price | | 13,983,816 | | |
| Sales | 13,983,816 | 27,967,632 | 69,919,080 | |
| Payout | 50% | 60% | 70% | |
| Total Distributed | 6,991,908 | 16,780,579 | 48,943,356 | |

| Categories | Numbers Matched | Prize (for $1) | Prize (for $2) | Prize (for $5) | Winners | Cost (1 in ) |
|---|---|---|---|---|---|---|
| I | 6 | $ 2,586,128.00 | $ 6,259,769.20 | $ 12,498,706.00 | 1 | 13,983,816.00 |
| II | 5 | $ 8,000.00 | $ 20,000.00 | $ 60,000.00 | 258 | 54,200.84 |
| III | 4 | $ 100.00 | $ 250.00 | $ 500.00 | 13,545 | 1,032.40 |
| IV | 3 | $ 4.00 | $ 8.00 | $ 20.00 | 246,820 | 56.66 |
| V | 2 | | | $ 5.00 | 1,851,150 | 7.55 |
| TOTAL | | | | | | |
| % of jackpot distribution | 20.7% | 50.1% | 100.0% | | |

FIG. 14

| PLAYER'S CHOICE GAME | N = available | 45 | 49 | 52 |
|---|---|---|---|---|
| | k = drawn | 6 | 6 | 6 |

| | | | | |
|---|---|---|---|---|
| Columns | | 8,145,060 | 13,983,816 | 20,358,520 |
| Price | | | 1 | |
| Sales | | 8,145,060 | 13,983,816 | 20,358,520 |
| Payout | | 50% | 60% | 70% |
| Total Distributed | | 4,072,530 | 8,390,290 | 14,250,964 |

| Categories | Numbers Matched | Prize (for 6/45) | Prize (for 6/49) | Prize (for 6/52) |
|---|---|---|---|---|
| I | 6 | $ 2,683,220.00 | $ 4,328,079.60 | $ 6,867,964.00 |
| II | 5 | $ 2,000.00 | $ 5,000.00 | $ 10,000.00 |
| III | 4 | $ 50.00 | $ 150.00 | $ 200.00 |
| IV | 3 | $ 2.00 | $ 3.00 | $ 5.00 |
| V | 2 | $ - | $ - | $ - |
| TOTAL | | | | |
| % of jackpot distribution | | 39.1% | 63.0% | 100.0% |

FIG. 16

SPECIFICALLY PROGRAMMED GAME-OPERATING COMPUTER SYSTEMS FOR CONDUCTING GAMES HAVING A COMMON JACKPOT AND COMPUTER-IMPLEMENTED METHODS OF USE THEREOF

RELATED APPLICATIONS

This application claims the priority of U.S. provisional patent application No. 62/100,794; filed Jan. 7, 2015; entitled "GAME-OPERATING COMPUTER SYSTEMS FOR GAMES HAVING A COMMON JACKPOT AND COMPUTER-IMPLEMENTED METHODS OF USE THEREOF," which is incorporated herein by reference in its entirety for all purposes.

FIELD OF INVENTION

In some embodiments, the present invention is related to specifically programmed game-operating computer systems for conducting games having a common jackpot and computer-implemented methods of use thereof.

BACKGROUND OF THE INVENTION

Interaction with schedules covering large scale data sets is ubiquitous. Activities that require specific systems and processes to interact with such schedules include but are not limited to, appointments (e.g., medical, dental, spa, professional, training, etc.), bookings (e.g., time slots for space, sport (golf, tennis, squash)), reservations (e.g., hotels), rentals (e.g., car, vacation, equipment), invitations (e.g., business, parties), social gatherings, sports leagues, etc.

SUMMARY OF THE INVENTION

In some embodiments, the present invention provides for a specifically programmed game operating computer system, including at least the following components: at least one specialized computer machine, including at least the following components: a non-transient memory, electronically storing particular computer executable program code; and at least one computer processor which, when executing the particular program code, becomes a specifically programmed computer processor of the specifically programmed game operating computer system that is configured to concurrently perform in real-time at least the following operations for at least a thousand (1,000) of players: electronically receiving, by the at least one specialized computer machine, in real-time, via a computer network, game entries data representing game entries from the at least 1,000 players, where each game entry data includes: i) game mode data, identifying at least one first game being played, ii) at least one price point selection, identifying an amount spent to purchase such game entry, and iii) at least one game playing selection by a corresponding player; where the at least one first game: i) has a first common jackpot feature, 1) where the first common jackpot feature is configured to be calculated, in real-time during game entry submission, based on the at least one first game having a plurality of options within at least one of the following parameters: a) a price point per game entry, b) a payout level, c) a prize structure, d) a common jackpot contribution collection, and e) a prize distribution mechanism; or ii) is configured to share a second common jackpot feature with at least one second game, 1) where the second common jackpot feature is configured to be calculated, in real-time during game entry submission, based on the at least one first game and the at least one second game having the plurality of options within at least one of the following parameters respectively: a) the price point per game entry, b) the payout level, c) the prize structure, d) the common jackpot contribution collection, and e) the prize distribution mechanism; electronically calculating, by the at least one specialized computer machine, in real-time during each game entry submission: 1) portion weight contributions for allocating game entry amounts to operate the first common jackpot feature or the second common jackpot feature, where the calculating of the portion weight contributions is based, at least in part, on the plurality of options within at least one of the following parameters: a) the price point per game entry, b) the payout level, and c) the prize structure; and 2) an current estimated common jackpot amount; electronically allocating, by the at least one specialized computer machine, in real-time, the game entry amounts from the game entries of the at least 1,000 players to operate the first common jackpot feature or the second common jackpot feature; and electronically determining, by the at least one specialized computer machine, at least one game winner; and electronically generating, by the at least one specialized computer machine, at least one prize distribution, comprising a common jackpot prize distribution based on the operation of the first common jackpot feature or the second common jackpot feature.

In some embodiments, the at least one first game is a first lottery game. In some embodiments, the at least one second game is a second lottery game. In some embodiments, the at least one game playing selection is: 1) randomly generated by a lottery terminal, or 2) electronically acquired from a lottery paper slip or a digital input submitted by such player via a specialized graphical user interface specifically programmed for the at least one first game. In some embodiments, the price point per game entry has at least two options which each player can select from. In some embodiments, the payout level has at least two options which each player can select from. In some embodiments, the prize structure parameter has at least two options which each player can select from.

In some embodiments, the present invention provides for a computer-implemented method, including at least the steps of: electronically receiving, by at least one specifically programmed computer processor, via a computer network, in real-time, game entries data representing game entries from at least a thousand (1,000) of players, where each game entry data includes: i) game mode data, identifying at least one first game being played, ii) at least one price point selection, identifying an amount spent to purchase such game entry, and iii) at least one game playing selection by a corresponding player; where the at least one first game: i) has a first common jackpot feature, 1) where the first common jackpot feature is configured to be calculated, in real-time during game entry submission, based on the at least one first game having a plurality of options within at least one of the following parameters: a) a price point per game entry, b) a payout level, c) a prize structure, d) a common jackpot contribution collection, and e) a prize distribution mechanism; or ii) is configured to share a second common jackpot feature with at least one second game, 1) where the second common jackpot feature is configured to be calculated, in real-time during game entry submission, based on the at least one first game and the at least one second game having the plurality of options within at least one of the following parameters respectively: a) the price point per game entry, b) the payout level, c) the prize structure, d) the common jackpot contribution collection, and e) the prize distribution mechanism; electronically calculating, by the at least one specifically programmed computer processor, in real-time during each game entry submission: 1) portion weight contributions for allocating game entry amounts to operate the first common jackpot feature or the second common jackpot feature, where the calculating of the portion weight contributions is based, at least in part, on the plurality of options within at least one of the following parameters: a) the price point per game entry, b) the payout level, and c) the prize structure; and 2) an current estimated common jackpot amount; electronically allocating, by the at least one specifically programmed computer processor, in real-time, the game entry amounts from the game entries of the at least 1,000 players to operate the first common jackpot feature or the second common jackpot feature; and electronically determining, by the at least one specifically programmed computer processor, at least one game winner; and electronically generating, by the at least one specifically programmed computer processor, at least one prize distribution, comprising a common jackpot prize distribution based on the operation of the first common jackpot feature or the second common jackpot feature.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIG. 14 illustrates embodiments of the present invention, showing an indicative prize structure designed with a single game mode/matrix and multiple price options, prize structures, and payout levels, offering a common jackpot pool.

FIG. 16 illustrates an example of utilizing certain exemplary logical rules in operating some embodiments of the present invention.

DETAILED DESCRIPTION OF THE INVENTION

Figure 1:
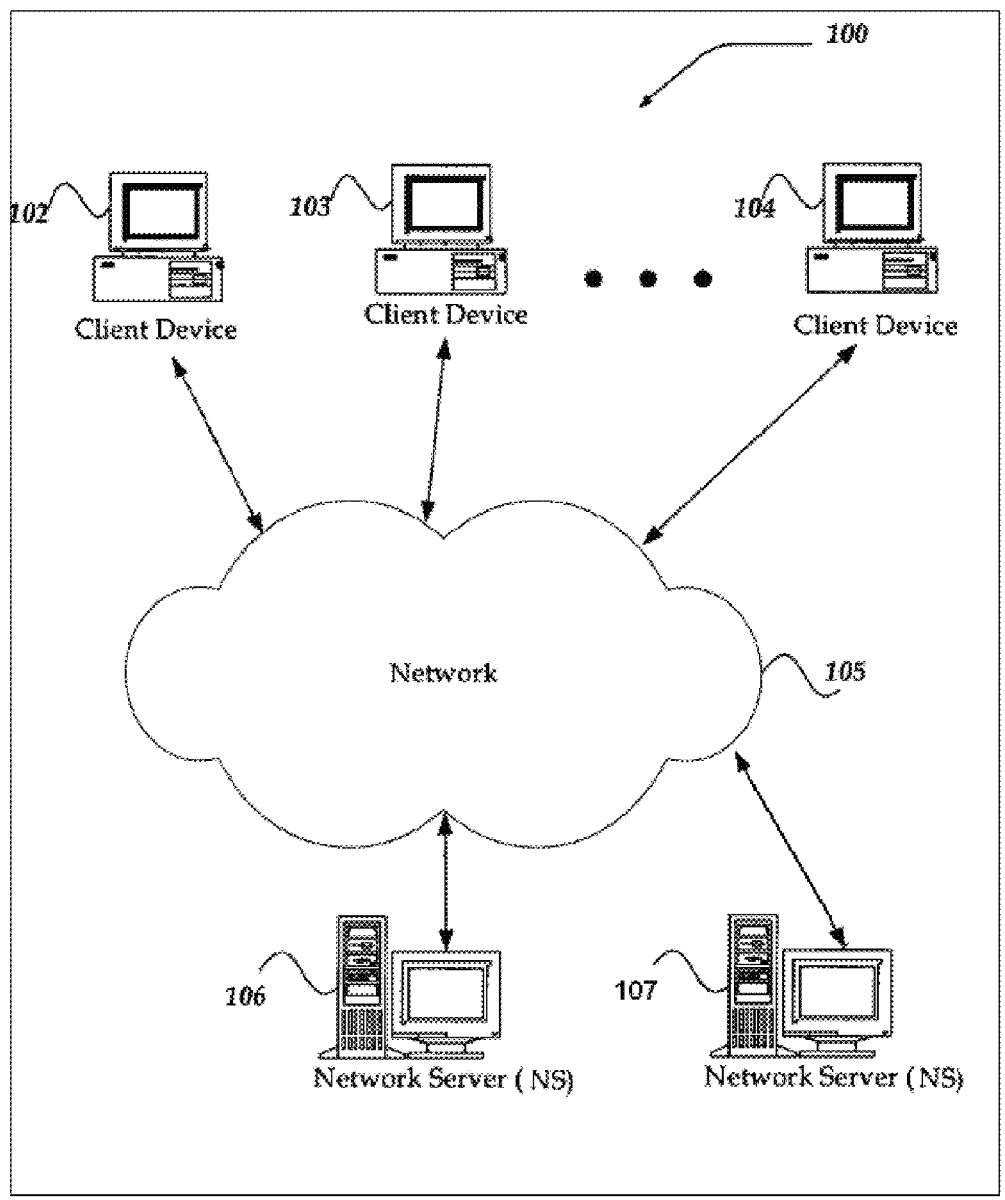
FIGS. 1-4 illustrate certain exemplary computer architecture in accordance with some principles of some embodiments of the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on".

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the inventive game-operating system(s) of the present invention can include the use of electronic mobile devices (e.g., smartphones, etc.) of players and server(s) in the distributed network environment, communicating over a suitable data communication network (e.g., the Internet, etc.) and utilizing at least one suitable data communication protocol (e.g., IPX/SPX, X.25, AX.25, AppleTalk, TCP/IP (e.g., HTTP), etc.).

In some embodiments, exemplary inventive game-operating system(s) can include the use of an electronic terminal(s), where the electronic terminal(s) can be any purpose terminal that transacts with individuals (e.g., a lottery terminal, a gaming terminal, a vending machine, a cashier register, an individual's mobile device being programmed to serve, as, for example, lottery and/or gaming terminal, etc.).

In some embodiments, the inventive game-operating system(s) of the present invention are configured to deliver a game including multiple options (e.g., but not limited to, 2, 3, 4, 5, 6, 7, 8, 9, 10, etc. options), where the options include: price points, payout levels, prize structures, winning odds, or any combination thereof, to each player of a plurality of players. In some embodiments, the inventive game-operating system(s) are configured to deliver the multiple options to each player of a plurality of players (e.g., but not limited to, at least 1,000 players, at least 10,000 players, at least 100,000 players, etc.) by use of a plurality of graphical user interfaces (GUIs) (e.g., but not limited to, at least 1,000 GUIs at least 10,000 GUIs, at least 100,000 GUIs, etc.). In some embodiments, each option/variation of the game includes a common jackpot pool, where the common jackpot pool is divided and/or shared among the winner(s), where the division of the common jackpot pool is calculated based on the participation parameters (i.e., options) chosen by each player of the plurality of players.

In some embodiments, the inventive game-operating system(s) of the present invention is/are configured to deliver a suite of games configured to display, in real-time, multiple options to each player of a plurality of players, where the suite of games shares a common feature (e.g., but not limited to, matrix/game mode, price point, etc.), and where the combined sales obtained/collected from each player of the plurality of players of the suite of games are used to fund a common jackpot pool (i.e., a single jackpot pool).

Example 1: Construction of a Multiple Options Game with a Common Jackpot Pool

In some embodiments, the inventive game-operating system(s) of the present invention is/are configured to deliver a suite of games configured to display, in real-time, multiple options to each player of a plurality of players (e.g., where the plurality of players can be 1,000 players, 10,000 players, 100,000 players, 1,000,000 players, etc.). In some embodiments, the inventive game-operating system incorporates predetermined parameters (i.e., options) for defining a game, where the predetermined parameters are designed by a game organizer/operator (e.g. Lottery Operator). In some embodiments, the predetermined parameters can include the following elements:
 one or multiple matrices/game modes;
 one or multiple price points;
 one or multiple payout levels;
 multiple prize structures; and
 a specified jackpot collection and distribution mechanism, from a plurality of jackpot collection and distribution mechanisms.

In some embodiments, the inventive game-operating system(s) of the present invention is/are configured to conduct game(s) having one or multiple matrices/game modes (e.g., Lotto, Number, Keno games, or any combination thereof). In some embodiments, the inventive game-operating system(s) of the present invention is configured to conduct game(s) having one or multiple price points, where the multiple price points share a pattern, where the pattern may assist the players to understand the game (e.g., x, 2x, 3x, 4x, 5x, etc.; x, 5x, 10x, 15x, etc.; x, 2x, 4x, 6x, 8x, etc.; or any other numeric pattern.)

In some embodiments, the inventive game-operating system(s) of the present invention is/are configured to deliver one or multiple payout levels to a player and/or a plurality of players, where the payout level(s) is/are based on the price point and/or matrix/game mode, where (1) payout levels and corresponding price points, and (2) matrices offered to each player can be related/correlated, e.g., but not limited to: payout level "x" at matrix "y", payout level "2x" at matrix "2y", payout level "3x" at matrix "3y", etc. In other embodiments, one or multiple payout levels can be offered to a player and/or a plurality of players, where (1) payout levels and corresponding matrix/game mode, and (2) price points offered to each player can be related/correlated, e.g., but not limited to: payout level "x" for price point "y", payout level "2x" for price point "2y", payout level "3x" for price point "3y", etc.

In some embodiments, the inventive game-operating system(s) of the present invention is/are configured to deliver multiple different prize structures, where each prize structure can offer a different number and/or value of prizes to at least one player and/or a plurality of players, where there can be a correlation between the prize structures utilized per (1) price point and (2) matrices offered, e.g., but not limited to: prize structure A at price point B with matrix C offered; prize structure A' at price point B' with matrix C' offered; etc.

In some embodiments, the inventive game-operating system(s) of the present invention is/are configured to conduct one of the following two jackpot collection and distribution mechanisms:
 (a) one common jackpot pool, and
 (b) separate jackpot funds with one common fund for jackpot increases.

Common Jackpot Pool

In some embodiments, the inventive game-operating system(s) of the present invention is/are configured to conduct a game that delivers at least one winning prize to at least one winning player, where the at least one winning prize is allocated from one common jackpot pool, where the common jackpot pool can be collected with assigned payout levels from all game modes and/or price points. In some embodiments, the jackpot winner(s) can be awarded a portion of the common jackpot pool. For example, in the case of three price points available, a first plurality of players participating with the lowest price point will be awarded x % of the jackpot collected, the mid-price point winners will receive 2x % of the jackpot collected, and the high price point winners will receive 5x % of the jackpot collected. In some embodiments, in the case of at least one winner of a single price point, the game is configured to deliver an assigned portion of the collected jackpot to that winner or winners of the particular price point, leaving for the next draw a remainder of the common jackpot pool to roll over and create and/or increase a subsequent jackpot. In some embodiments, when there are winners from all price points (e.g., winner A wins at price point A' and winner B wins at price point B' where all price points include A' and B', etc.), the entire common jackpot pool can be shared among winners A and B based on a predetermined ratio (e.g., but not limited to: x %:2x %, x %:5x %, etc.).

Separate Jackpot Funds with One Common Fund/Pool for Jackpot Increases

In some embodiments, the inventive game-operating system(s) of the present invention is/are configured to fund separate jackpot pools, one for each different game option, and one common pool to fund jackpot increases, where each game mode/price point can fund a separate jackpot pool, and where a portion of each game mode and/or price point sales can be collected to fund the common pool for jackpot increases. In some embodiments, the jackpot winner(s) (i.e. winning player(s)) can be awarded a portion or the entirety of the jackpot collected for the game mode and/or price point based on a winning player's choice and/or a portion of the jackpot increase based on the winning player's game mode/ price point participation, e.g., for example, but not limited to, winning players identified as having chosen the lowest price point will be awarded x % of the jackpot increase collected, the mid-price point winners 2x % of the jackpot increase collected, and the high price point winners 5x % of the jackpot increase collected, in addition to the jackpot collected for the price point selected by the winning player(s). In some embodiments, when a winner(s) is/are determined from any price point, a predetermined/assigned portion of the jackpot increase can be distributed to the winner, leaving for the next draw the rest of the common pool for jackpot increases to roll over. In some embodiments, when at least a winner is determined from all price points (e.g., A winner from A' price point, B winner from B' price point, and C winner from C' price point, where the price points include A', B', and C'), the entire jackpot increase fund will be shared among them (e.g., A, B, and C) in accordance to the preset ratio per price point (for instance: x %, 2x %, and 5x %).

Example 1

One Matrix/Game Mode & One Common Jackpot Pool/Fund

In one embodiment of the inventive game-operating system(s) of the present invention, the game can be configured to allow a game operator (e.g., lottery operator) to create a first game having multiple options, configured to deliver to a plurality of players: a single matrix/game mode, having one common draw for simplicity (as a non-limiting example: Lotto 6/49) where the game is configured to offer a plurality of players three price points, e.g. $1, $2, $5 (any three non-identical price points can be used; e.g., but not limited to, $0.25, $1.00, and $4.00; $5, $10, and $15; $2, $4, $6, etc.). In some embodiments, the first game has rules that are designed to provide increasing payout levels per price point so as to compensate for anticipated participation levels, where higher price points may attract fewer players than lower price points.

In some embodiments, the first game of the present invention has further rules that are designed to construct different prize structures for the higher price matrices so as to offer increased value to each player, in terms of winning categories and/or values of prizes. In some embodiments, the first game has rules that are designed to provide additional value to each player out of a plurality of players in order to motivate each player of a plurality of players to spend/buy more for the first game although it offers the same chance of winning across available game options (i.e., with the same odds of winning).

In some embodiments, the inventive game-operating system(s) of the present invention is/are configured to conduct a game that operates a common jackpot fund/pool to provide at least one top prize(s) to at least one winning player of a plurality of players. In some embodiments, a particular game in accordance with the present invention can operate a common jackpot pool collected from all price points according to assigned/predetermined payout allocation. In some embodiments, another particular game in accordance with the present invention can have rules where the jackpot winner(s) will be awarded a portion of the common jackpot (common jackpot prize distribution) that corresponds to a particular price participation/payment (i.e., the common jackpot prize distribution is based on the operation of the common jackpot). As a non-limiting example, winning player(s) having paid the lowest price point will be awarded 20% of the jackpot collected, the mid-price winning player(s) will be awarded 50% of the jackpot collected, and the high price winning player(s) 100% of the jackpot collected.

In some embodiments, the inventive game in accordance with the present invention can have rules where a winner can be selected from any price point. In some embodiments, the game is configured to deliver the assigned portion of the jackpot to a winner(s), and will keep, e.g., for the next draw(s), the rest of the jackpot pool to roll over and fund jackpots in future draw(s). In some embodiments, when a winner is found from all price points, the entire jackpot fund will be shared among the winners in accordance to the preset ratio per price point, and no jackpot fund will be rolled over to future draws.

Example 2

One Matrix/Game Mode & Separate Jackpot Funds with One Common Fund for Jackpot Increases In another embodiment of the inventive game-operating system(s) of the present invention, the game can be configured to allow a game operator (e.g., lottery operator) to create a first game having multiple options, configured to deliver to a player and/or a plurality of players: a single matrix/game mode, having one common draw, as a non-limiting example: Lotto 6/49, where the game is configured to offer a plurality of players three price points, e.g., but not limited to, $1, $2, $5 (any three non-identical price points can be used; e.g., but not limited to, $0.25, $1.00, and $4.00; $5, $10, and $15; $2, $4, $6, etc.). In some embodiments, the first game has rules that are designed to offer increasing payout levels per price point so as to compensate for anticipated participation levels, where higher price points might typically attract fewer players than lower price points. In some embodiments, the first game of the present invention has further rules that are designed to construct different prize structures for the higher priced matrix/game mode, offering increased value to each player, in terms of winning categories and/or value of prizes. In some embodiments, the first game has rules that are designed to motivate each player of a plurality of players to spend/buy more for the same game (i.e., with the same odds of winning).

In some embodiments, the inventive game-operating system(s) is configured to conduct games that use separate jackpot funds/pools having one common fund/pool for jackpot increases. In some embodiments, each price point can fund a separate jackpot pool, and a portion of each price point sale(s) can be collected and delivered to fund the common fund/pool utilized for jackpot increases. As a non-limiting example of the inventive game-operating system, the $1 price game mode jackpot can be funded by 20% of the game mode sales, the $2 price point by 18% of the game mode sales, and $5 price by 22% of the game mode sales, where starting jackpot levels could be set per price point, which may further increase the appeal of the game modes to each player of the plurality of players, e.g., but not limited to: $250,000 for the $1 price game mode, $800,000 for the $2 price game mode, and $1,500,000 for the $5 price game mode.

In another embodiment, the inventive game-operating system(s) of the present invention is/are configured to collect a secondary fund/pool, where the secondary fund/pool will be collected conjointly (common jackpot) by all price point game modes and can be used to fund further jackpot increases. As a non-limiting example, 7% of the $1 game mode, 4% of the $2 game mode, and 3% of the $5 game mode can be collected in each draw without a winner and will be used to fund the common jackpot increase for the next draw (i.e., used for operating the common jackpot).

In some embodiments, the inventive game-operating system(s) of the present invention is/are configured to award a winning player(s) the jackpot/winnings collected for the price point of the winning player's choice and the portion of the jackpot increase that corresponds to the winning player's price participation. As a non-limiting example: the winning player(s) of the $1 can be awarded 20% of the jackpot increase collected, the $2 winning players can be awarded 50%, and the $5 winning players can be awarded 100% of the jackpot increase collected.

In some embodiments, the inventive game-operating system(s) of the present invention is/are configured to identify a winning player at a price point, where the winning player will collect the assigned portion of the jackpot increase, leaving for the next draw the remainder of the jackpot pool to roll over and fund a jackpot in future draw(s) (e.g., a higher jackpot). In some embodiments, when a winning player is identified from each price point (thus, winning players are identified at all price points), the entire jackpot increase fund will be shared among all of the winning players in accordance to a preset ratio per price point.

Example 3

One Price Option & One Common Jackpot Fund

In some embodiments of the inventive game-operating system(s) of the present invention, the system can be configured to allow a game operator (e.g., lottery operator) to create a first game having multiple options, configured to deliver to a plurality of players: one single price option, (e.g., but not limited to, $1) and three distinct matrices/game modes with increasing winning odds. As non-limiting examples:

(A) the pool of numbers the player selects from (e.g. 6 numbers out of 45 numbers (6/45), 6/49, 6/52), or (B) the pool of numbers the player needs to predict (e.g. 5/49, 6/49, 7/49), or (C) the pool of the numbers the player selects in order to match with a set pool of drawn numbers (e.g., 6/6/49, 7/6/49, 8/6/49).

In some embodiments, the first game of the inventive game-operating system of the present invention has rules that are designed to: (a) increase payout levels per matrix/game mode so as to compensate for anticipated participation levels, where more difficult game modes may attract fewer players than easy to win modes. In some embodiments, the first game of the present invention has further rules that are designed to use different prize structures for the more difficult/challenging matrices/game modes, offering increased value to a player, in terms of winning categories and/or value of prizes. In some embodiments, the inventive game-operating system(s) of the present invention is/are configured to conduct games that use/distribute a common jackpot fund/pool collected from all matrices/game modes according to the assigned payout levels for each matrix/game mode. In some embodiments, an exemplary inventive game-operating system is configured to award jackpot winning players a corresponding portion of the jackpot according to the winning player's game participation. As a non-limiting example, the players of the easiest price point will be awarded 20% of the jackpot collected, the mid-difficulty winners 50%, and the high difficulty winners 100% of the jackpot collected. In some embodiments, the game is configured to identify a winning player at a matrix/game mode and to deliver the corresponding assigned portion of the jackpot pool, and will keep, e.g., for the next draw(s), the rest of the jackpot pool to roll over and fund jackpots in future draw(s) (e.g., larger jackpots). In some embodiments, when a winner is identified from all game modes, the entire jackpot fund/pool will be shared among the winners in accordance to the preset ratio per matrix/game mode.

Example 4

One Price Option & Separate Jackpot Funds with One Common Fund for Jackpot Increases In another embodiment of the inventive game-operating system(s) of the present invention, the game can be configured to allow a game operator (e.g., lottery operator) to create a first game having multiple options, configured to deliver to a plurality of players: one single price option, (e.g., but not limited to, $1) and three distinct matrices/game modes with increasing winning odds (by manner of modifying either the pool of numbers the player selects or needs to predict). Non-limiting examples of distinct matrices/game modes include:

(A) the pool of numbers the player selects from (e.g. 6/45, 6/49, 6/52), or (B) the pool of numbers the player needs to predict (e.g. 5/49, 6/49, 7/49), or (C) the pool of the numbers the player selects in order to match with a set pool of drawn numbers (e.g., 6/6/49, 7/6/49, 8/6/49).

In some embodiments, the first game of the inventive game-operating system of the present invention has further rules that are designed to offer increasing payout levels per matrix/game mode so as to compensate for anticipated participation levels, where more difficult game modes may attract fewer players than easy to win modes. In some embodiments, the first game of the present invention has further rules that are designed to use different prize structures for the more difficult/challenging matrices/game modes, offering increased value to a player, in terms of number of winning categories and/or value of prizes. In some embodiments, the inventive game-operating system(s) of the present invention is/are configured to conduct games having separate jackpot funds/pools per game mode/matrix, and one common fund/pool for jackpot increases. In some embodiments, each game mode can fund a separate jackpot pool, and a portion of each game mode sales can be collected to fund the common fund/pool for jackpot increases. As a non-limiting example of the inventive game-operating system: the 6/45 lotto jackpot can be funded by 20% of the game mode sales, the 6/49 lotto by 18% of the game mode sales, and 6/52 lotto by 22% of the game mode sales, where starting jackpot levels could be set per game mode, which may further increase appeal of the game modes to each player of the plurality of players, e.g., but not limited to: $250,000 for the 6/45 game mode, $800,000 for the 6/49 price game mode, and $1,500,000 for the 6.52 price game mode.

In some embodiments, the inventive game-operating system(s) of the present invention is configured to collect a secondary fund/pool, where the secondary fund/pool will be collected conjointly from all game modes and used to fund further jackpot increases. As a non-limiting example, 7% of the 6/45 lotto, 4% of the 6/49 lotto, and 3% of the 6/52 lotto will be collected in each draw without a winning player and will be used to fund the jackpot increase for the next draw.

In some embodiments, the inventive game-operating system(s) of the present invention is/are configured to award a winning jackpot player(s) the jackpot/winnings collected for the game mode of the winner's choice and the portion of the jackpot increase that corresponds to the winning player's game participation. As a non-limiting example: the winning player(s) of the 6/45 lotto can be awarded 20% of the jackpot increase collected, the 6/49 winning players 50%, and the 6/52 winning players 100% of the jackpot increase collected, in addition to the jackpot fund collected for the game mode they selected.

In some embodiments, the inventive game-operating system(s) of the present invention is/are configured to identify a winning player at a game mode and award the winning player(s) an assigned portion of the jackpot increase, leaving for the next draw the rest of the jackpot pool to roll over. In some embodiments, when a winning player is identified from each game mode (thus, winning players are identified at all game modes) the entire jackpot increase fund will be shared among all of the winning players in accordance to the preset ratio per game mode/matrix selected.

General Player Participation Procedure

In some embodiments, the inventive game-operating system(s) of the present invention is/are configured to conduct a lottery game having multiple options, where the options include: price points, payout levels, prize structures, jackpot collection and distribution mechanism(s), or any combination thereof. A non-limiting example includes a Lottery Operator offering a lotto 6/49 game with 3 price points ($1, $2, $5), that correspond to three payout levels (50%, 60%, 70% accordingly) and 3 prize structures (with 4, 4 and 5 winning categories each, including prizes of increasing value). In some embodiments, the game is configured to receive a player's game playing selection. As a non-limiting example, the player's selection can be: (a) a 6-number combination and a price point or (b) a randomly selected number combination and a price point from a system database of the inventive game-operating system. In some embodiments, the game is configured to receive each player's entry of a plurality of players' entries by identifying each purchase(s)/transaction. In some embodiments, the game is configured to record (i.e., log) the selection of each player of the plurality of players. In some embodiments, the game is configured to dispense at least one ticket through a terminal to each player of the plurality of players, where the at least one ticket includes information regarding the 6-number combination and/or the price point selected. In some embodiments, the game is configured to receive updates regarding number and price point selection of each player of a plurality of players. As a non-limiting example, the game is configured to conduct a public draw of 6 numbers out of the 49 available numbers. In some embodiments, the game is configured to verify a player's winnings based on the 6 numbers drawn, where winnings are directly related to/depend on an amount of numbers a player(s) has/have matched and the price point the player(s) has/have selected. In some embodiments, the game is configured to update the jackpot level for the next draw based on the number of top winning players per price point.

In some embodiments, the present invention(s) is/are a method configured for conducting a lottery game, comprising the steps of: (i) constructing a single game mode; (ii) generating a plurality of price points to present to each player of a plurality of players; (iii) identifying a plurality of payout levels, where each payout level corresponds to each available price point; (iv) determining winning categories, with prize structures awarding prizes of different number and value to players of different price points and payout levels; (v) identifying a single common jackpot pool to fund the top prize for all price points available by collecting a predetermined share of the sales of the different price points; (vi) conducting a draw, the results of which will allow the system to identify (a) at least a winning player and award the top prize in accordance to the price point the winning player had chosen, or (b) the absence of a winning player and transfer the collected fund to the next draw.

In some embodiments, the present invention is/are an inventive method(s) for conducting a lottery game, comprising the steps of: (i) constructing a single game mode; (ii) identifying a plurality of price points to present to each player of a plurality of players; (iii) generating a plurality of payout levels, where each payout level corresponds to each available price point; (iv) determining winning categories, with prize structures awarding prizes of different number and value to players of different price points and payout levels; (v) setting a predetermined share of the sales of each different price point to fund the individual top prize of each price point; (vi) collecting a predetermined share of the sales of the different price points into a single jackpot pool to fund the increases of the top prize; (vii) conducting a draw, the results of which will allow the system to identify (a) at least a winning player and award the top prize in accordance to the price point the winning player had chosen (both the top prize collected for the price point the winning player had chosen, and the portion of the common fund for jackpot increases designed for the price point the winning player had chosen), or (b) the absence of a winning player and transfer the collected fund to the next draw.

In some embodiments, the present invention is/are an inventive method(s) for conducting a lottery game, comprising the steps of: (i) setting a single price option; (ii) generating a plurality of game modes available for player participation; (iii) setting a plurality of payout levels, where each payout level of the plurality of payout levels is available for each game mode; (iv) determining winning categories, with prize structures awarding prizes of different number and value to players of different game modes and payout levels; (v) identifying a single jackpot pool to fund the top prize for all game modes available by collecting a predetermined share of the sales of the different game modes; (vi) conducting a draw, the results of which will allow the system to identify (a) at least a winning player and award the top prize in accordance to the game mode the winning player had chosen, or (b) the absence of a winning player and transfer the collected fund to the next draw.

In some embodiments, the present invention is/are an inventive method(s) for conducting a lottery game, comprising the steps of: (i) setting a single price option; (ii) generating a plurality of game modes available for player participation; (iii) setting a plurality of payout levels, where each payout level of the plurality of payout levels is available for each game mode; (iv) determining winning categories, with prize structures awarding prizes of different number and value to players of different game modes and payout levels; (v) setting a predetermined share of the sales of each different game mode to fund the individual top prize of each game mode; (vi) collecting a predetermined share of the sales of the different game modes into a common jackpot pool to fund the increases of the top prize; (vii) conducting a draw, the results of which will allow the system to identify (a) at least a winning player and award the top prize in accordance to the game mode the winning player had chosen, or (b) the absence of a winning player and transfer the collected fund to the next draw.

In some embodiments, the present invention is/are an inventive method(s) for conducting a lottery game, comprising the steps of: (i) generating a game with a single matrix/game mode, where the game is configured to include a plurality of: (a) price points, (b) payout levels, and (c) prize structures, (ii) identifying a method to collect and dispensing a common jackpot pool; (iii) delivering a ticket to a player containing the game data and/or price point selected by the player; (iv) drawing the winning game data from a pool of game data options; (v) identifying a winning player(s) at a price point and/or more price points, where the winning player is identified by the winning ticket; (vi) awarding at least a portion of the common jackpot pool based on the price point of the winning ticket to the winning player(s), or any combination thereof.

In some embodiments, the present invention is/are an inventive method(s) for conducting a lottery game, comprising the steps of: (i) designing a game having: (a) a single matrix/game mode and (b) multiple price points, payout levels, prize structures, jackpot pools, or any combination thereof; (ii) identifying a method to collect a single common pool to be used for jackpot increases; (iii) dispensing a ticket containing the game data and/or the selected price point to each player of a plurality of players; (iv) drawing the winning game data from a pool of game data options; or any combination thereof. In some embodiments, the game further comprises of: (v) identifying at least one winning player by using the information on a player's ticket in correlation to the winning game data, and (vi) awarding the jackpot pool collected for the price point of the winning ticket, where the awarded jackpot comprises of (a) the top prize collected for the price point the player in possession of the winning ticket had chosen, and (b) the share of the common fund for jackpot increases designed for the price point the player in possession of the winning ticket had chosen, where this jackpot increase share is increased in accordance to the price point of the winning ticket.

In some embodiments, the present invention is an inventive method(s) for conducting a lottery game, comprising the steps of: (i) designing a game having: (a) a single price point and (b) multiple game modes/matrices, payout levels, prize structures, or any combination thereof, (ii) identifying a method to collect a single common jackpot pool and distribute this pool to each player of a plurality of players; (iii) dispensing a ticket to each player of a plurality of players, where each ticket contains game data according to the game mode selected by each player of the plurality of players; (iv) drawing the winning game data from a pool of game data options; (v) determining a winning mode, where a predetermined amount of game data in the winning game data combination coincides with the game data contained in the dispensed tickets per game mode; (vi) awarding portion(s) of the common jackpot, depending on the game mode of the winning ticket, or any combination thereof.

In some embodiments, the present invention is/are an inventive method(s) for conducting a lottery game, comprising the steps of: (i) designing a game having (a) a single price point, and (b) multiple game modes/matrices, payout levels, prize structures, jackpot pools, or any combination thereof (ii) identifying a method to collect and distribute a single pool for jackpot increases; (iii) dispensing a ticket, where the ticket contains the game data according to the game mode selected by the player, to each player of a plurality of players; (iv) drawing the winning game data from an available pool of game data options; (v) determining a winning mode, where a predetermined amount of game data in the winning game data combination coincides with the game data contained in the dispensed tickets per game mode; (vi) awarding the jackpot pool collected for the game mode the winning ticket bares, where the jackpot comprises of (a) the top prize collected for the game mode the player in possession of the winning ticket had chosen, and (b) the share of the common fund for jackpot increases designed for the game mode the player in possession of the winning ticket had chosen, where this jackpot increase share is increased in accordance to the game mode identified on the winning ticket, or any combination thereof.

In some embodiments, the game is an enhancement of an existing lottery game, currently available in the local Lottery market (e.g., keno, lotto, number, etc.). In some embodiments, the game is a new lottery game. In some embodiments, the game is designed to generate a player-specific result, allowing for players to know instantly whether they have won a prize (e.g., personalized presentation of drawing results, personalized game environment for playing a game, etc.). In some embodiments, the game is designed to generate a generic result which is common for all participating players (e.g., universal presentation of drawing results, universal game environment for playing a game, etc.).

In some embodiments, the present invention is an inventive game-operating system(s) for conducting a lottery game(s), comprising: (i) designing a game having (a) a single game mode and (b) multiple price points, payout levels, prize structures, or any combination thereof, (ii) collecting a common jackpot pool to be funded by predetermined shares of the sales from each price point; (iii) dispensing a ticket containing game data following the rules of the game mode, and price point selected by each player of a plurality of players; (iv) drawing winning game data from an available pool of game data options; (v) determining a winning mode, where a predetermined amount of game data in the winning game data combination coincides with the game data contained in the dispensed tickets per price point; (vi) awarding jackpot shares depending on the price point identified on the winning ticket, or any combination thereof.

In some embodiments, the present invention is/are an inventive game-operating system(s) for conducting a lottery game, comprising: (i) designing a game having (a) a single price point and (b) multiple game modes/matrices, payout levels, prize structures, or any combination thereof, (ii) collecting a single common jackpot pool to be funded by predetermined shares of the sales from each game mode; (iii) dispensing a ticket containing game data according to game mode selected; (iv) drawing the winning game data from available pool of game data options; (v) determining a winning mode, where a predetermined amount of game data in the winning game data combination coincides with the game data contained in the dispensed tickets per game mode; (vi) awarding jackpot shares depending on the game mode the winning ticket bares, or any combination thereof.

Figure 5:
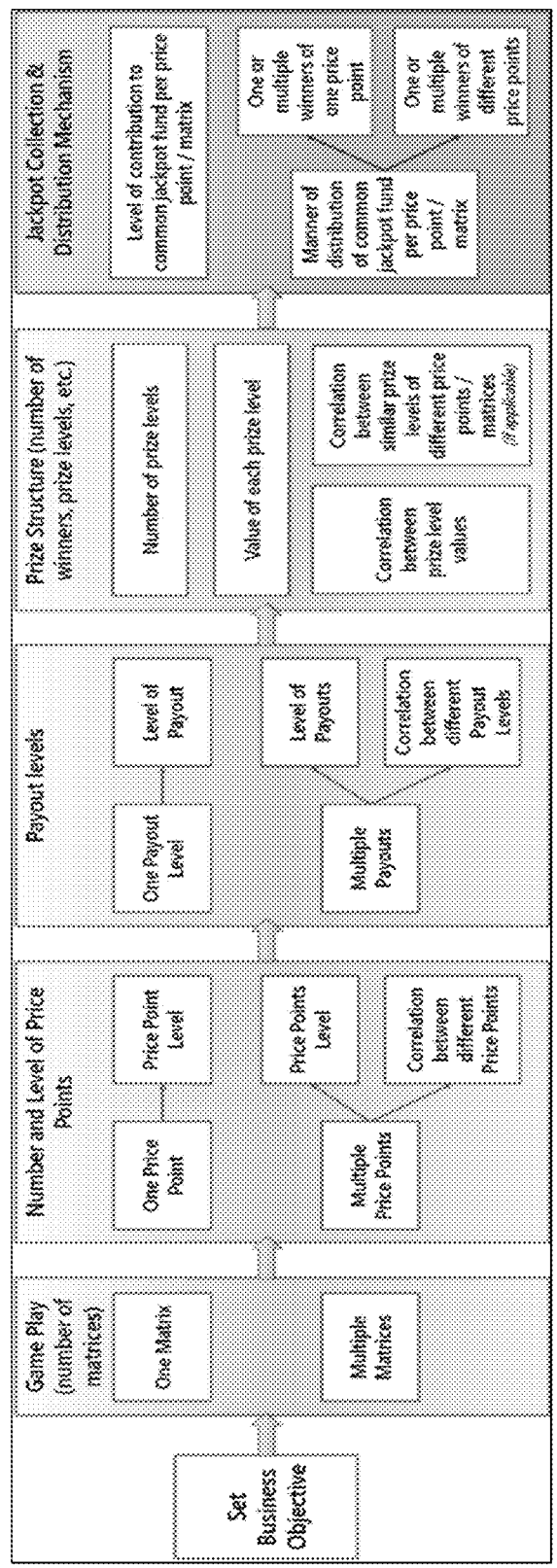
FIGS. 5-11 illustrate certain exemplary logical rules diagrams for operating some embodiments of the present invention.

FIG. 5 illustrates an embodiment of the inventive game-operating system of the present invention, showing a flow chart of a business decision tree.

Figure 6A:
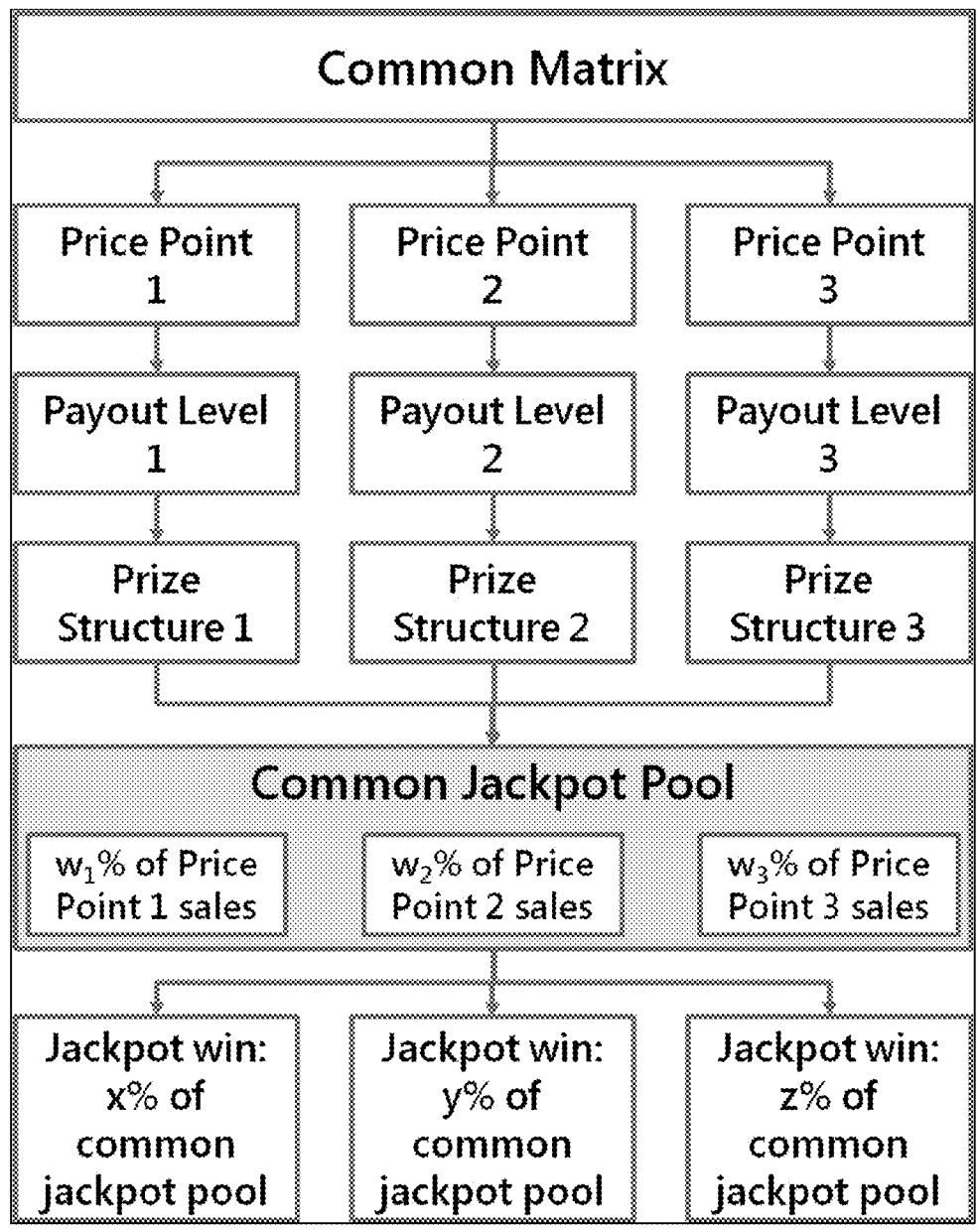
Figure 6B:
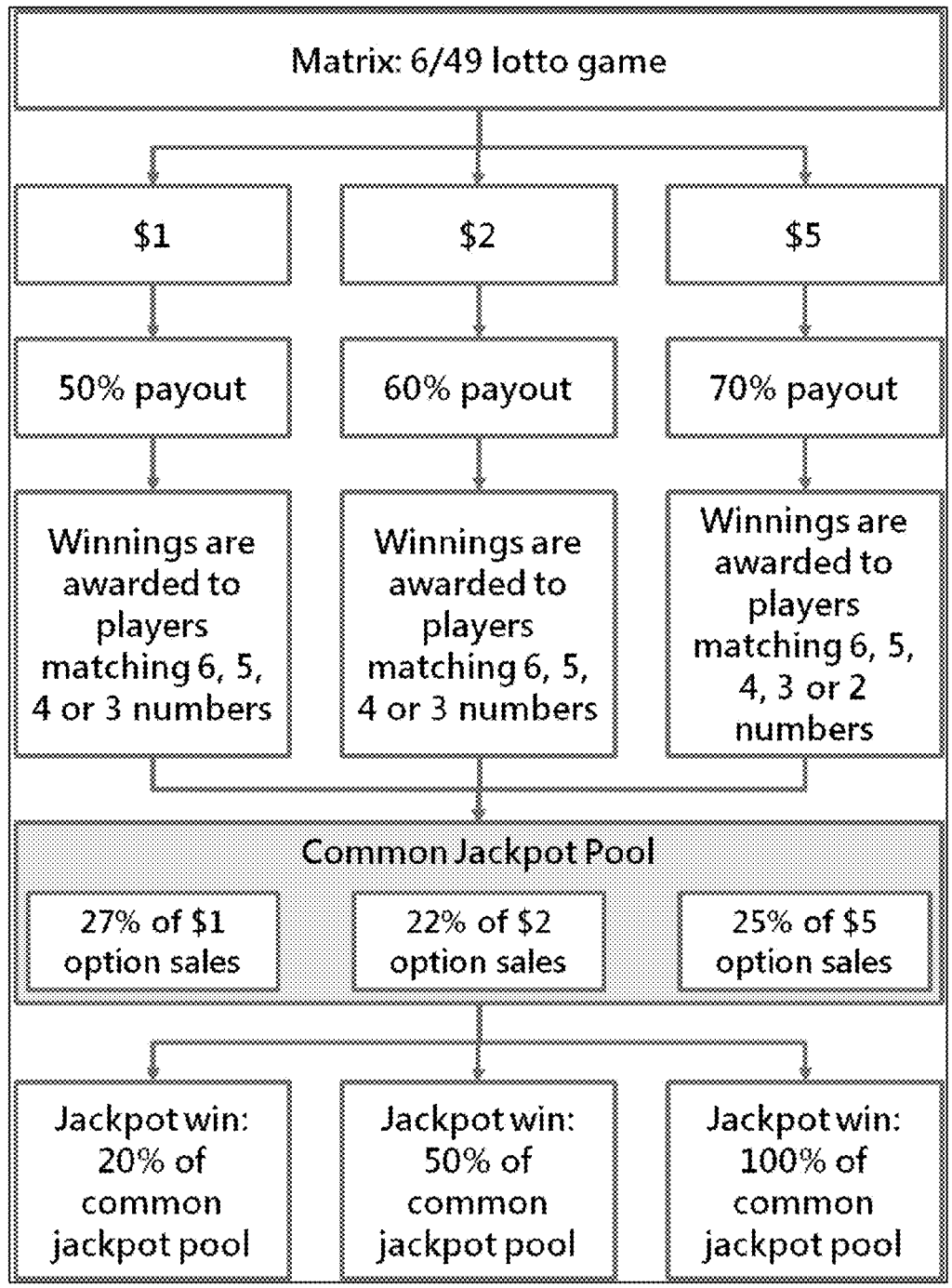

FIGS. 6A and 6B illustrate embodiments of the inventive game-operating system of the present invention, each figure showing flow charts of a common matrix and method of collection and distribution of a single jackpot pool among price points.

Figure 7A:
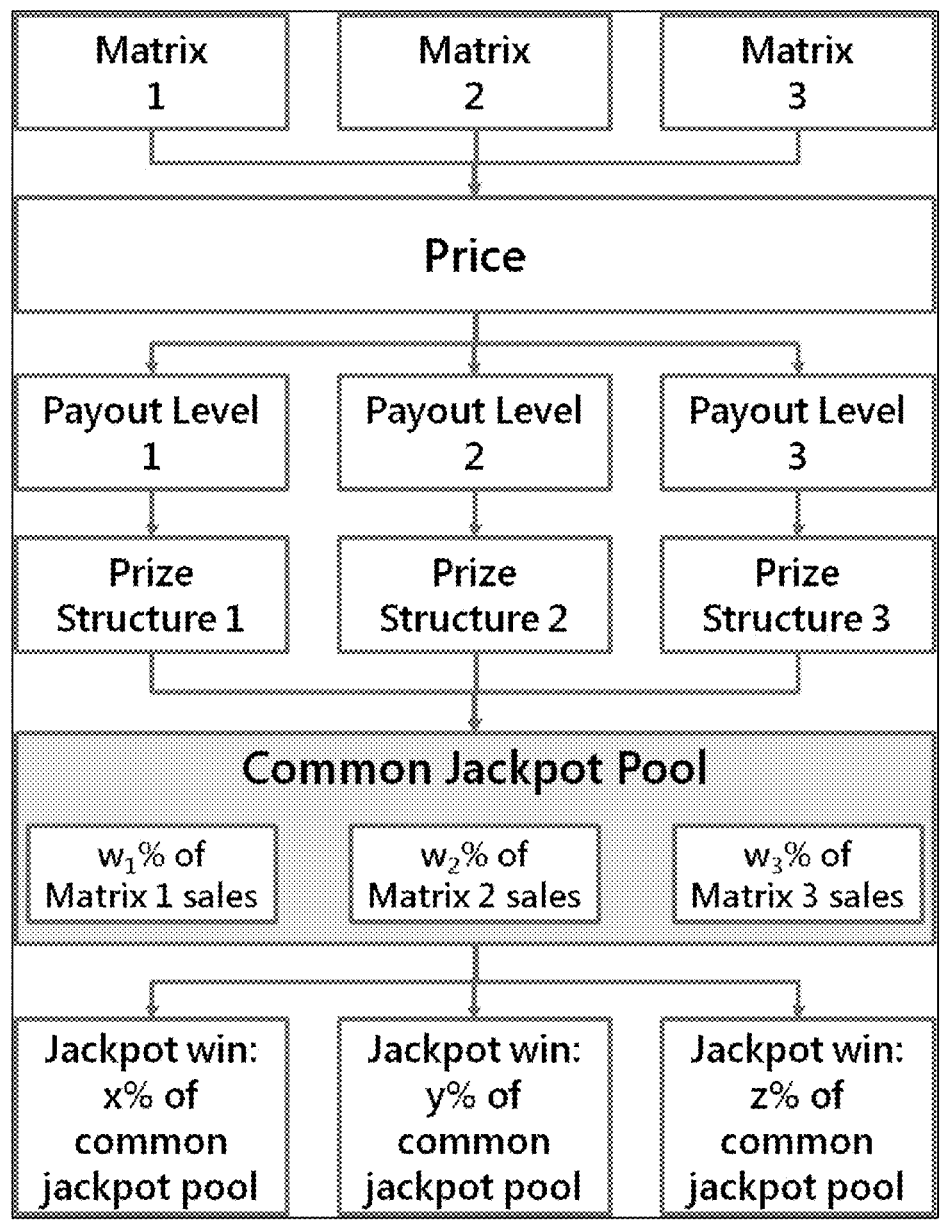
Figure 7B:
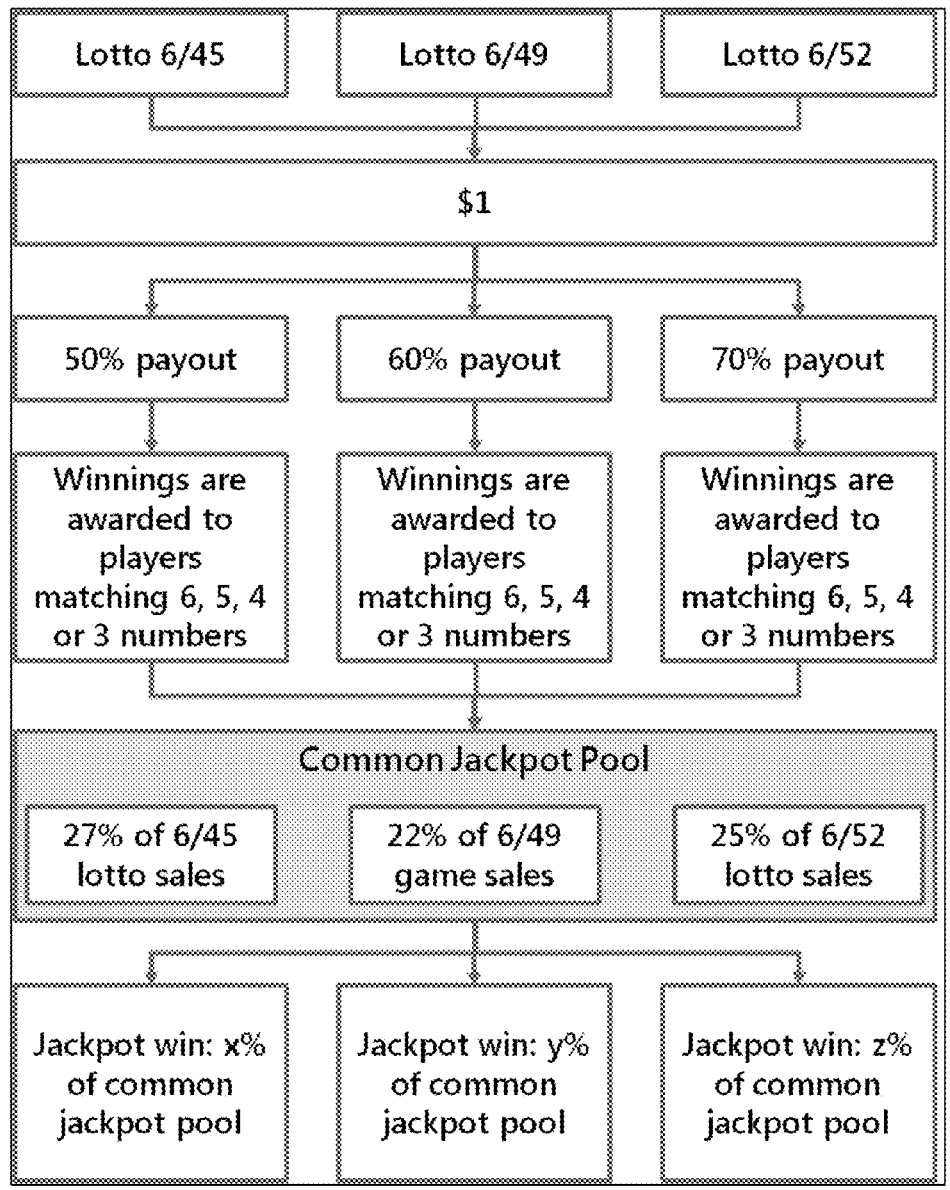
Figure 7C:
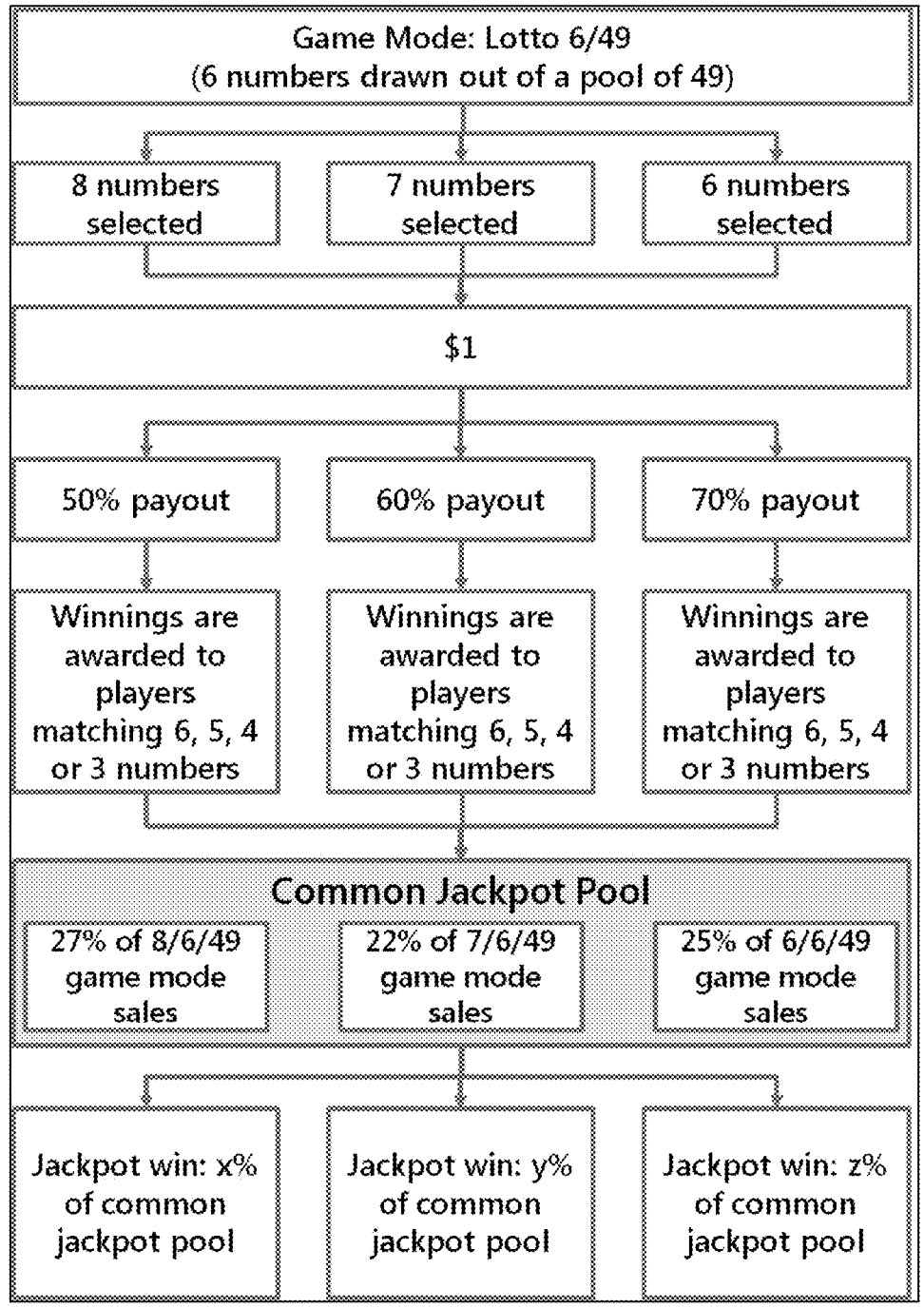

FIGS. 7A, 7B, and 7C illustrate embodiments of the inventive game-operating system of the present invention, showing flow charts of a game combination of different game modes/matrices having a common price and a common jackpot pool.

Figure 8A:
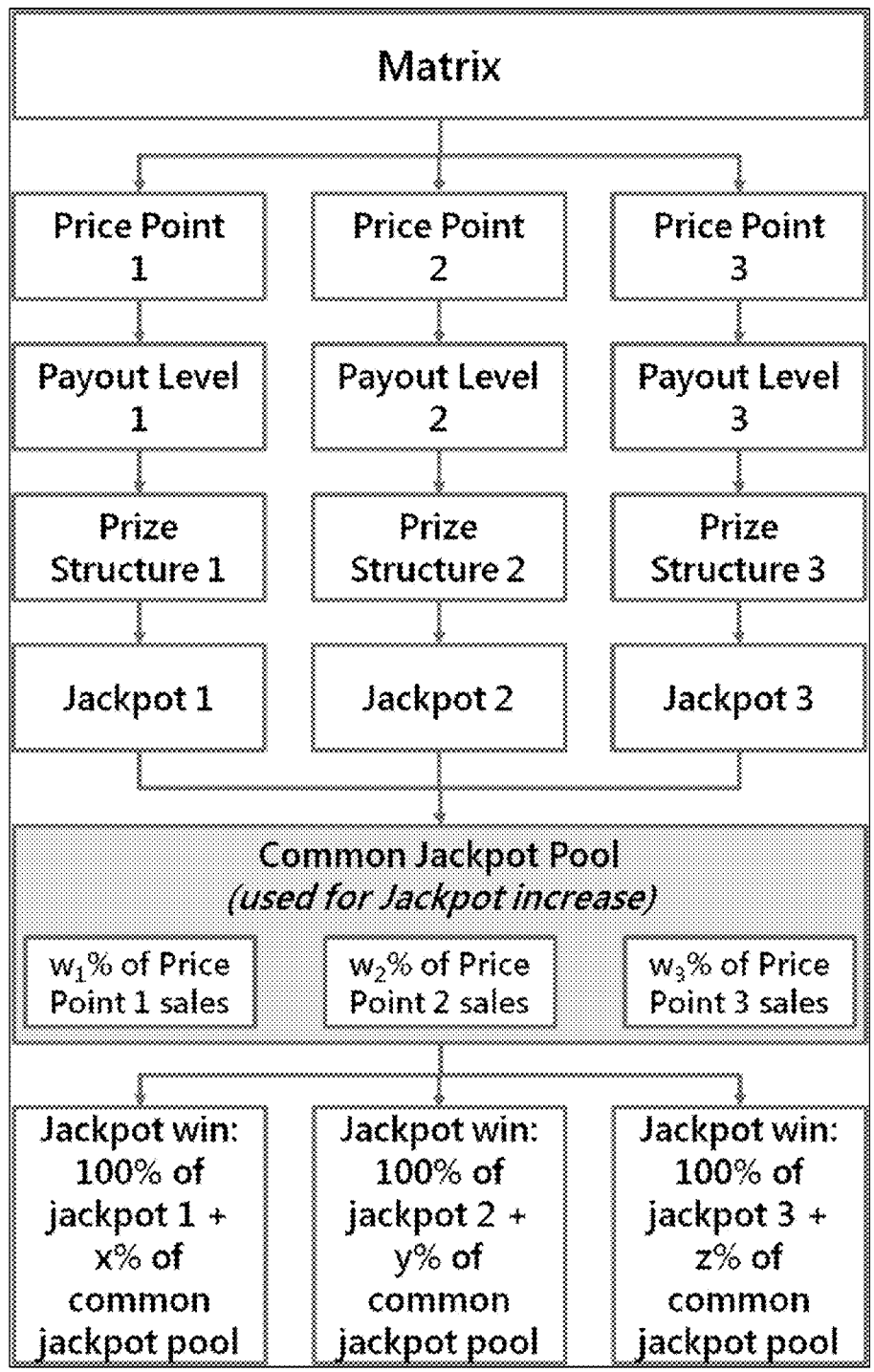
Figure 8B:
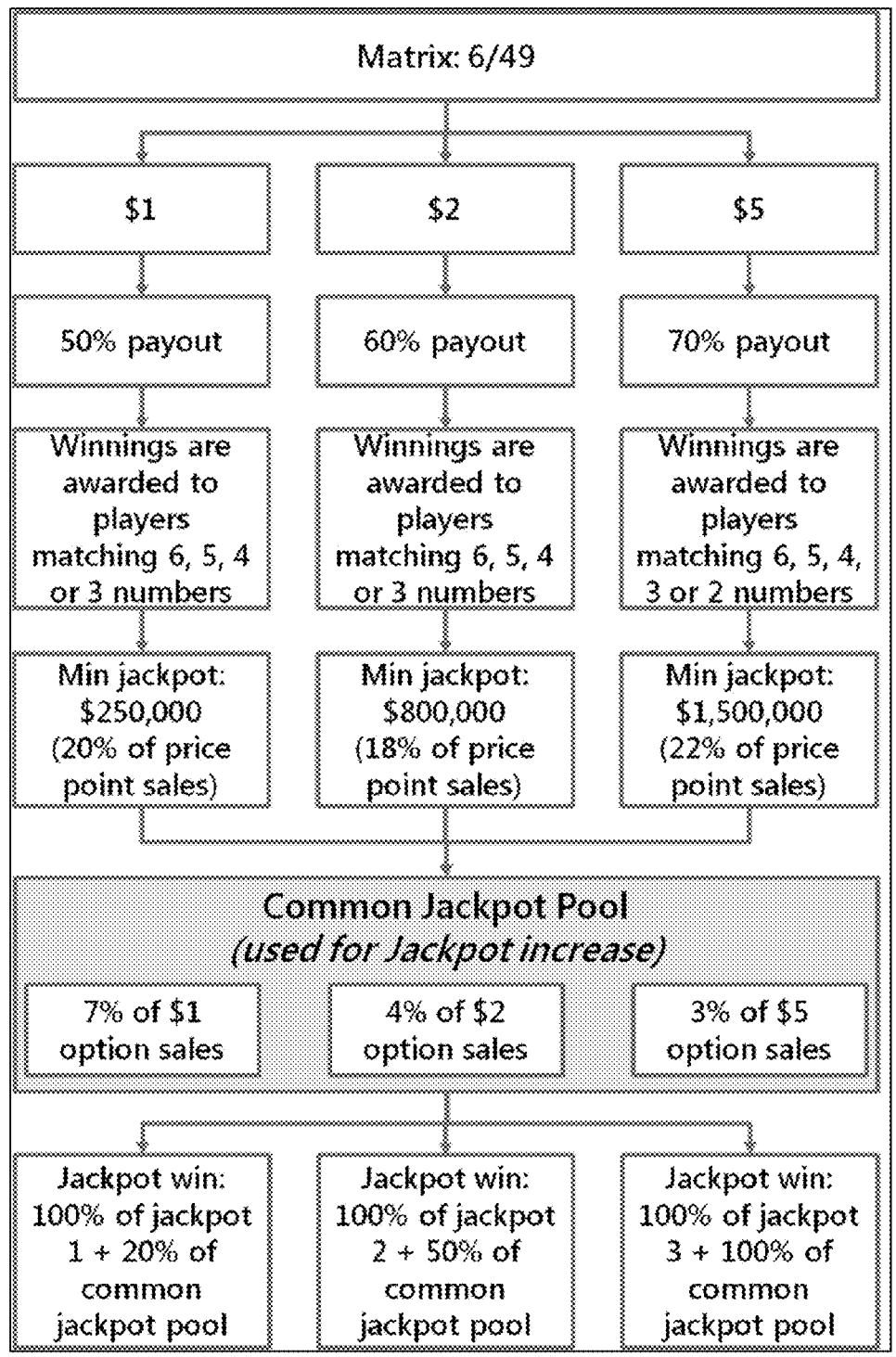

FIGS. 8A and 8B illustrate embodiments of the inventive game-operating system of the present invention, showing flow charts of a common game mode/matrix (e.g., in winning mode), showing three price points, each with individual jackpot pool, and a common pool utilized for jackpot increases.

Figure 9A:
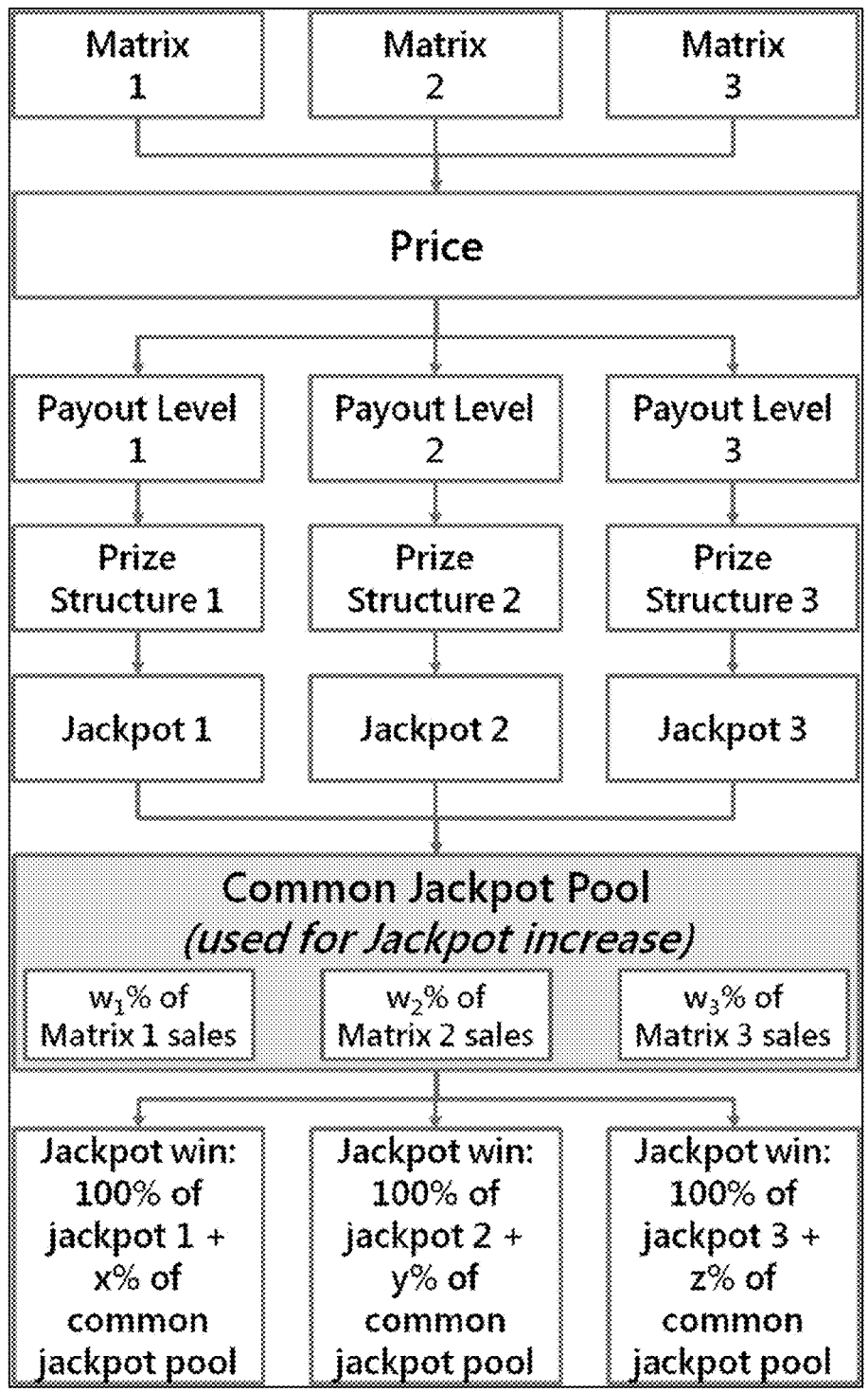
Figure 9B:
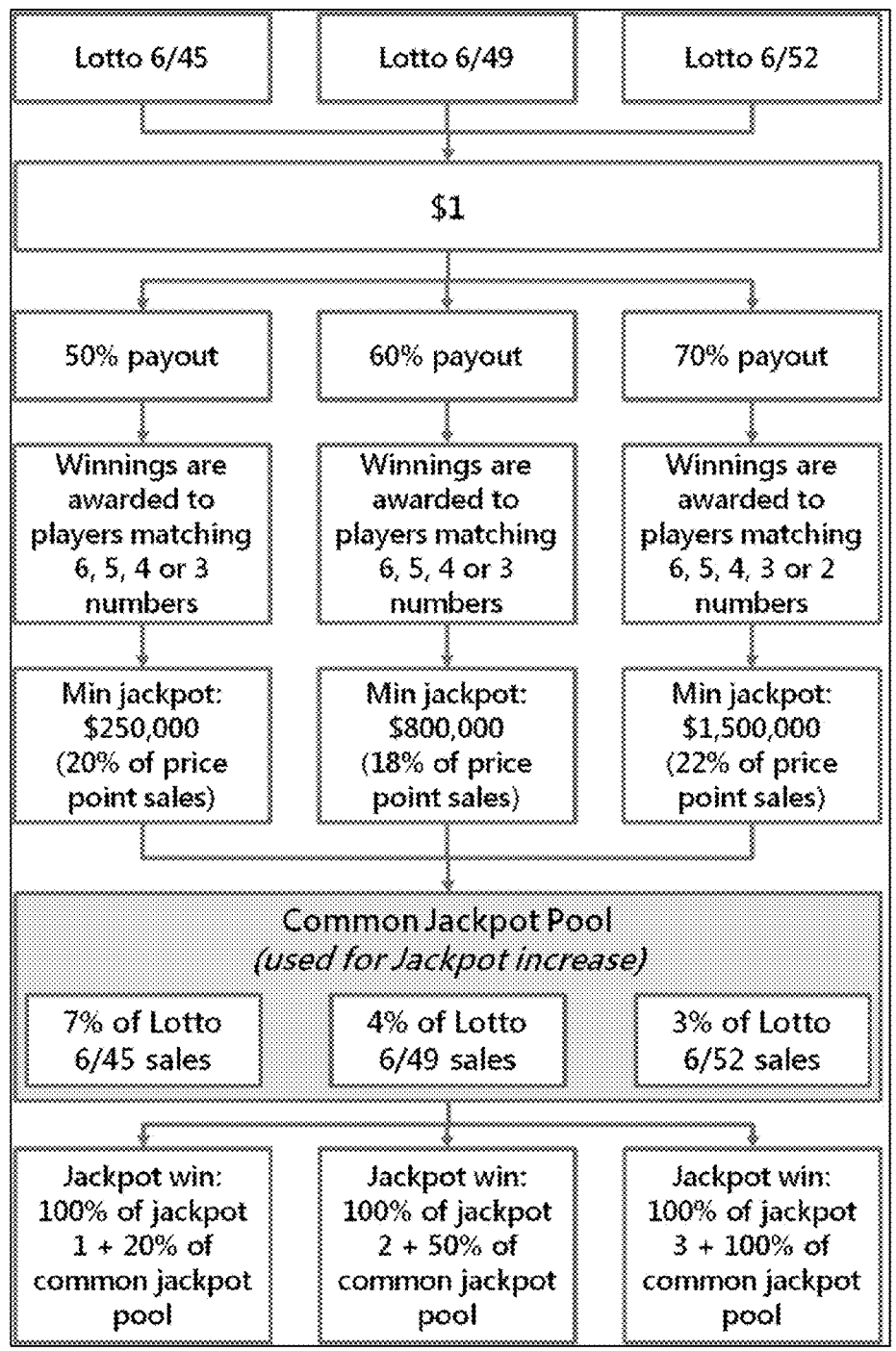
Figure 9C:
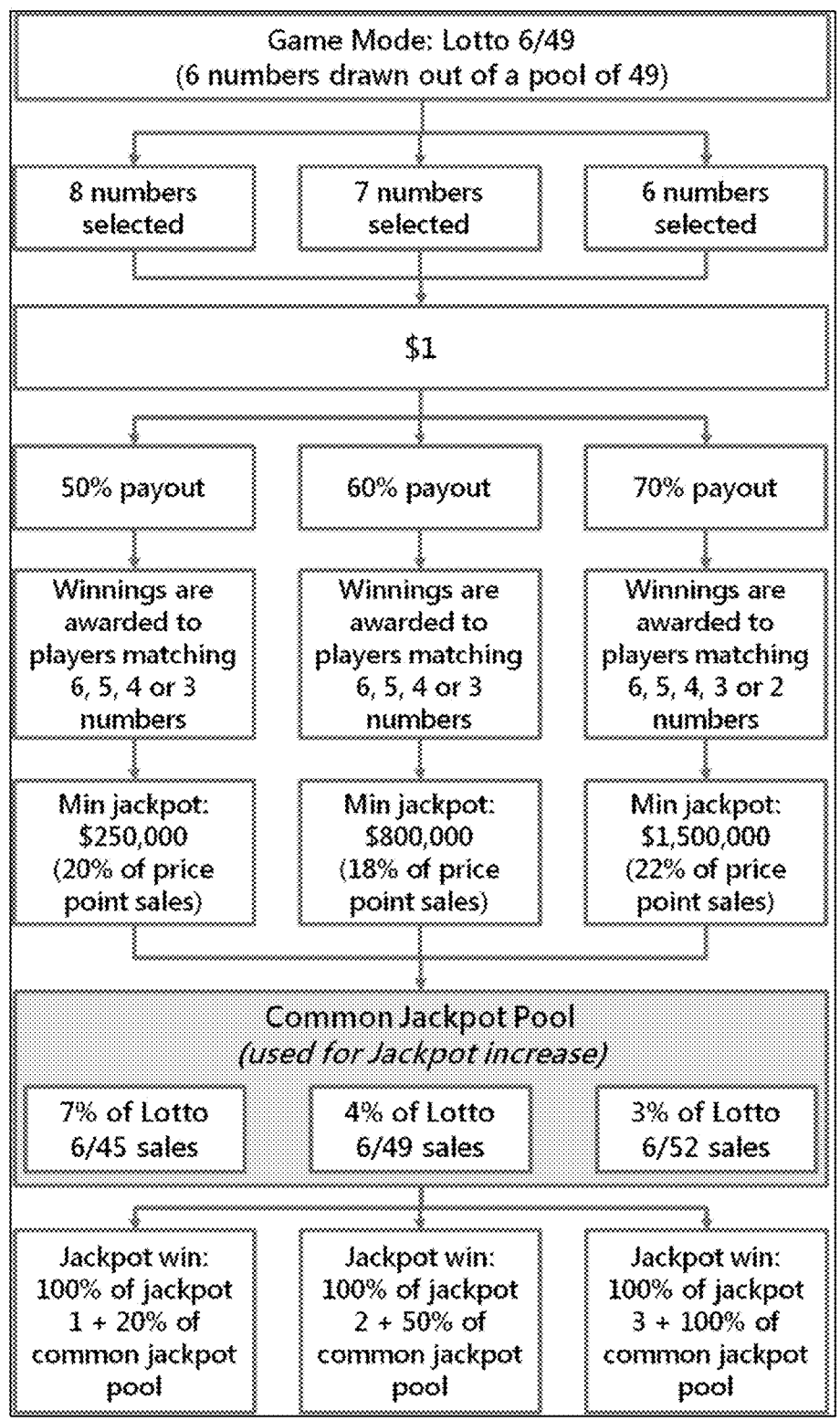

FIGS. 9A, 9B, and 9C illustrate embodiments of the inventive game-operating system of the present invention, showing flow charts of a common game mode/matrix having one price point, varying payouts, prize structures and jackpot pools, and one common pool utilized for jackpot increases.

Figure 10:
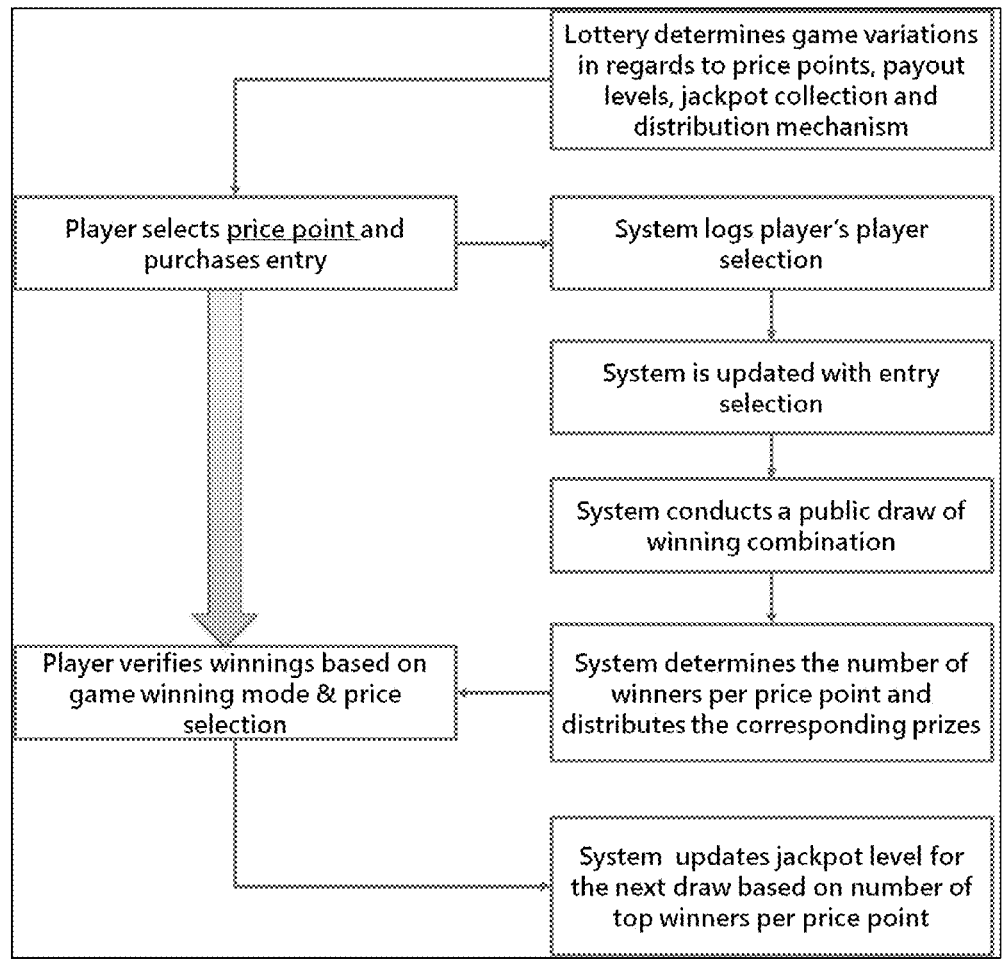

FIG. 10 is a flow chart illustrating the steps of the inventive game-operating method of the present invention.

Figure 11:
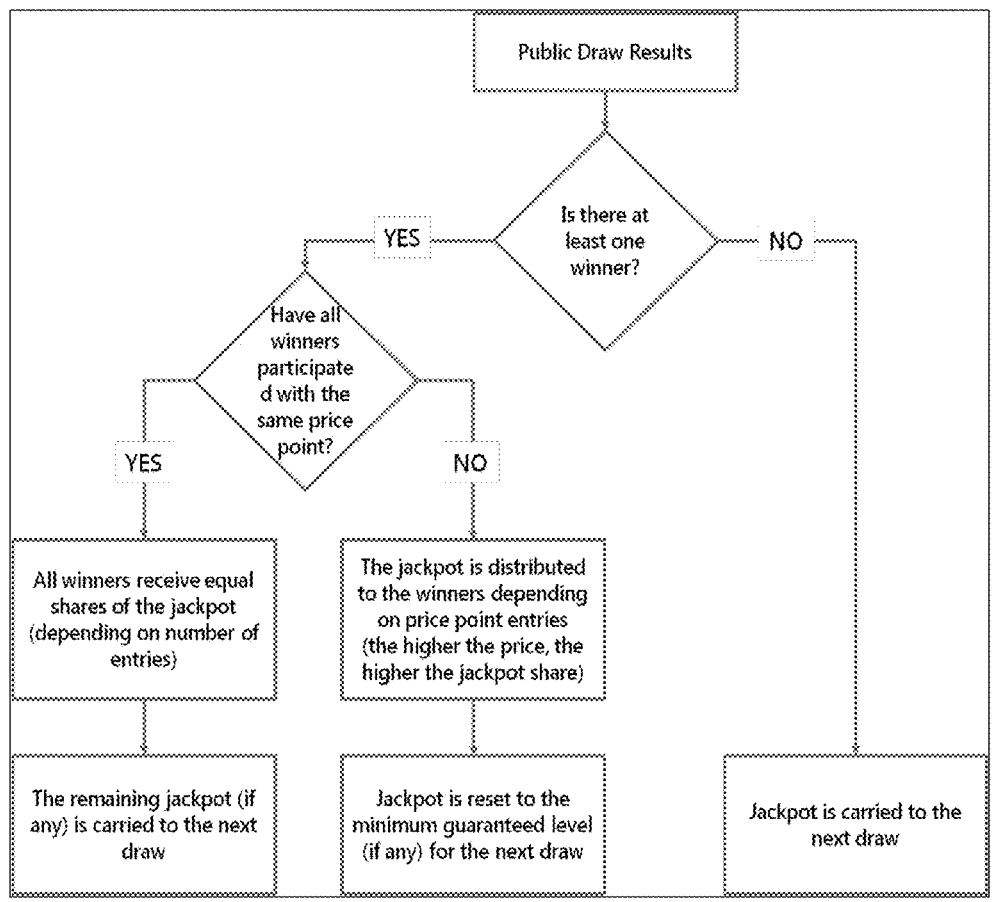

FIG. 11 is a flow chart illustrating the steps of the inventive game-operating method of the present invention, showing the jackpot distribution mechanism in the case of one or multiple winners from one or more price points and/or game modes.

Figure 12:
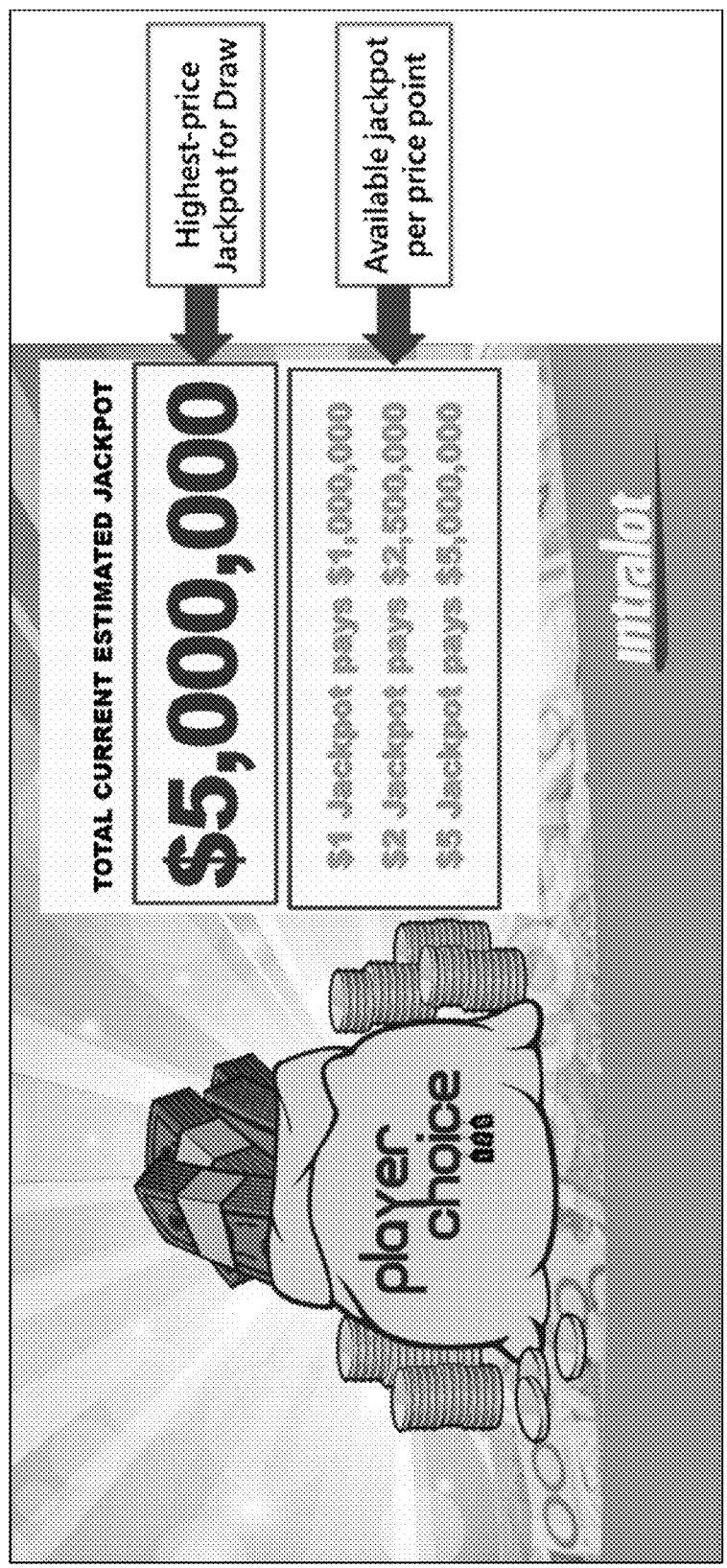
FIG. 12 illustrates certain exemplary visual game output generated in accordance with some principles of some embodiments of the present invention.

FIG. 12 is an illustration of the jackpot announcement of a single game mode/matrix and multiple price points, each awarding a different share of the common jackpot pool to the winners.

Figure 13A:
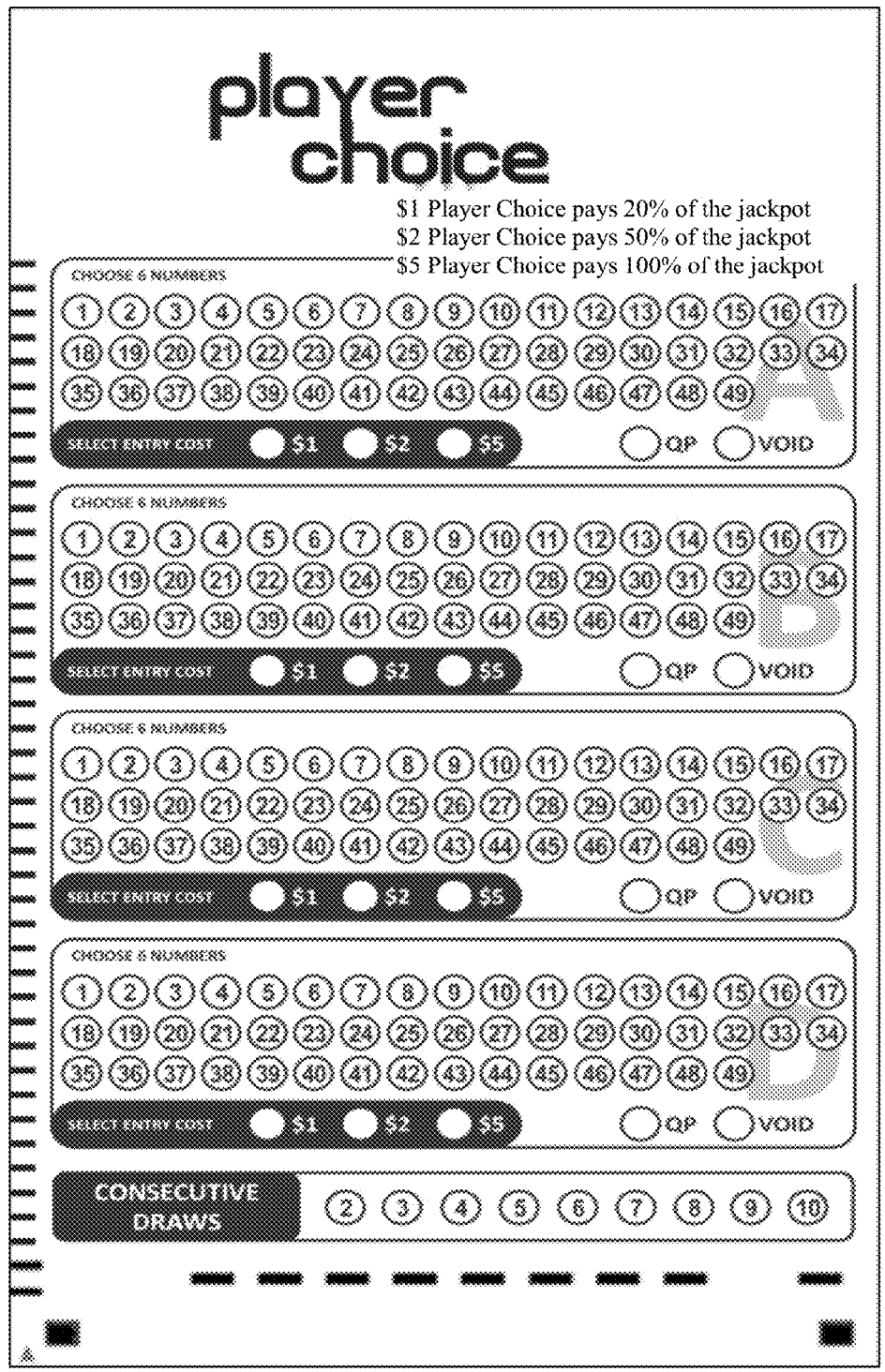
FIGS. 13A-13C illustrate certain exemplary paper game outputs (e.g., lottery entry slips, lottery receipt) utilized in accordance with some embodiments of the present invention.
Figure 13B:
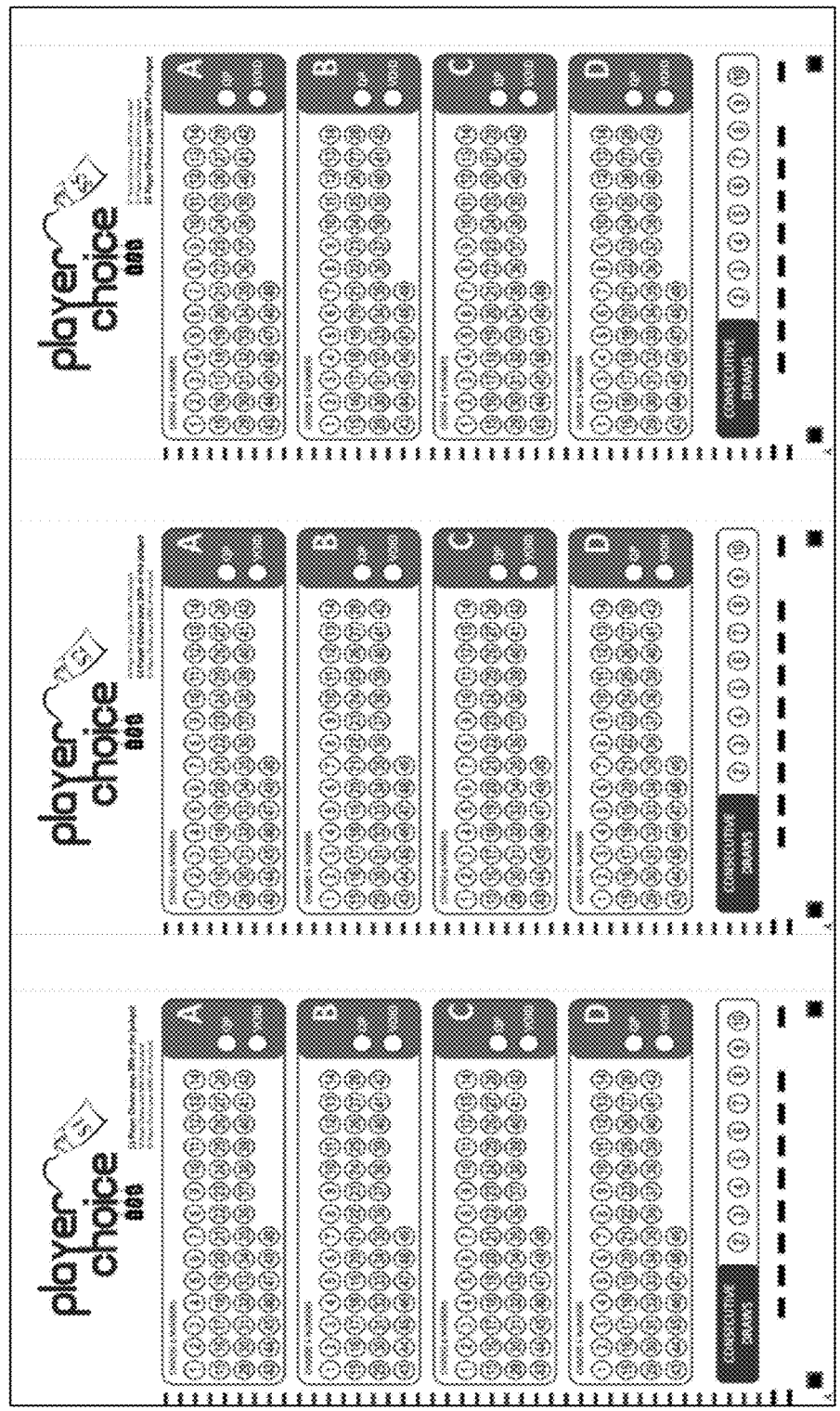
Figure 13C:

FIGS. 13A, 13B, and 13C illustrate indicative designs of playslips and tickets utilized for the embodiments of the present invention offering players a single game mode/matrix and jackpot pool, and multiple price options.

FIG. 14 illustrates embodiments of the present invention, showing an indicative prize structure designed with a single game mode/matrix and multiple price options, prize structures, and payout levels, offering a common jackpot pool.

Figure 15A:
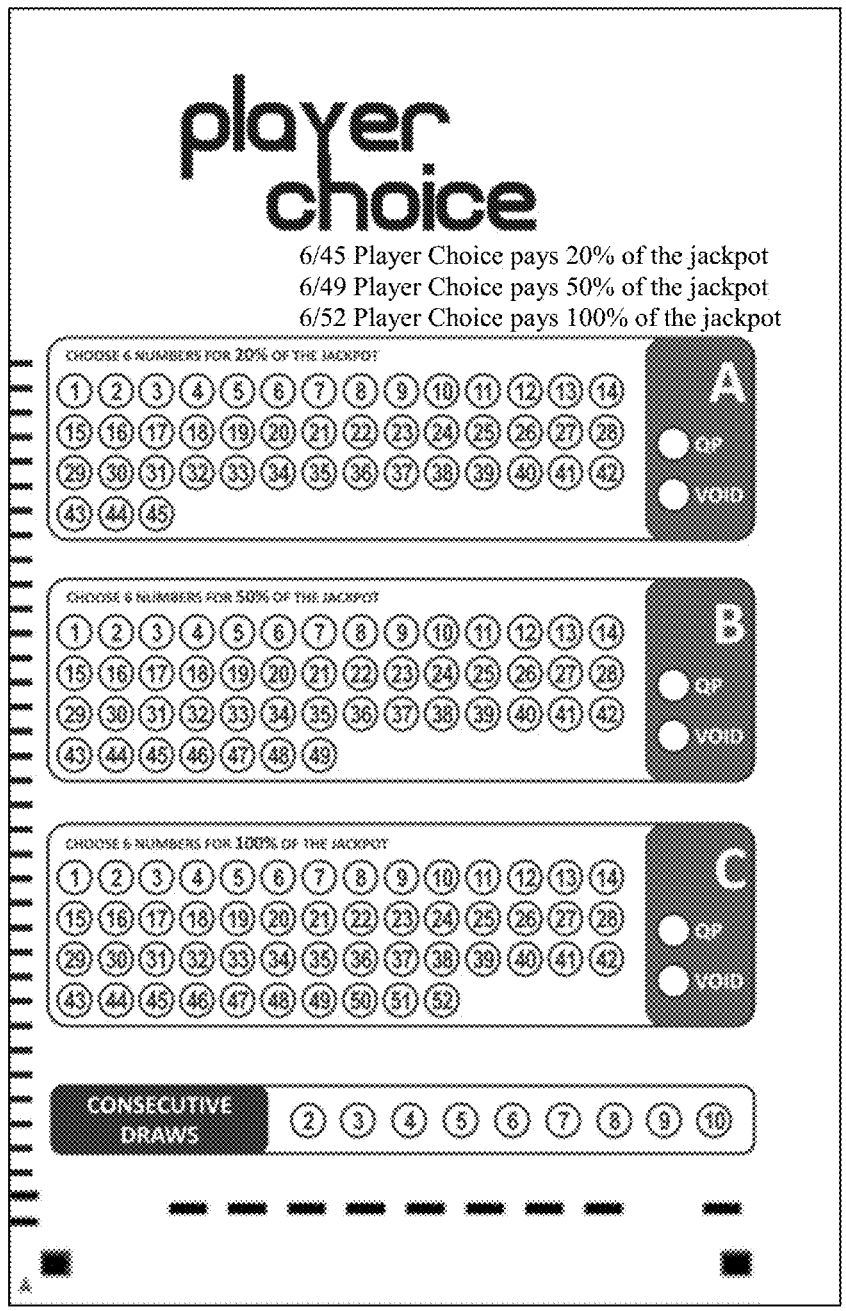
FIGS. 15A-15B illustrate certain exemplary paper game outputs (e.g., lottery entry slips) utilized in accordance with some embodiments of the present invention.
Figure 15B:
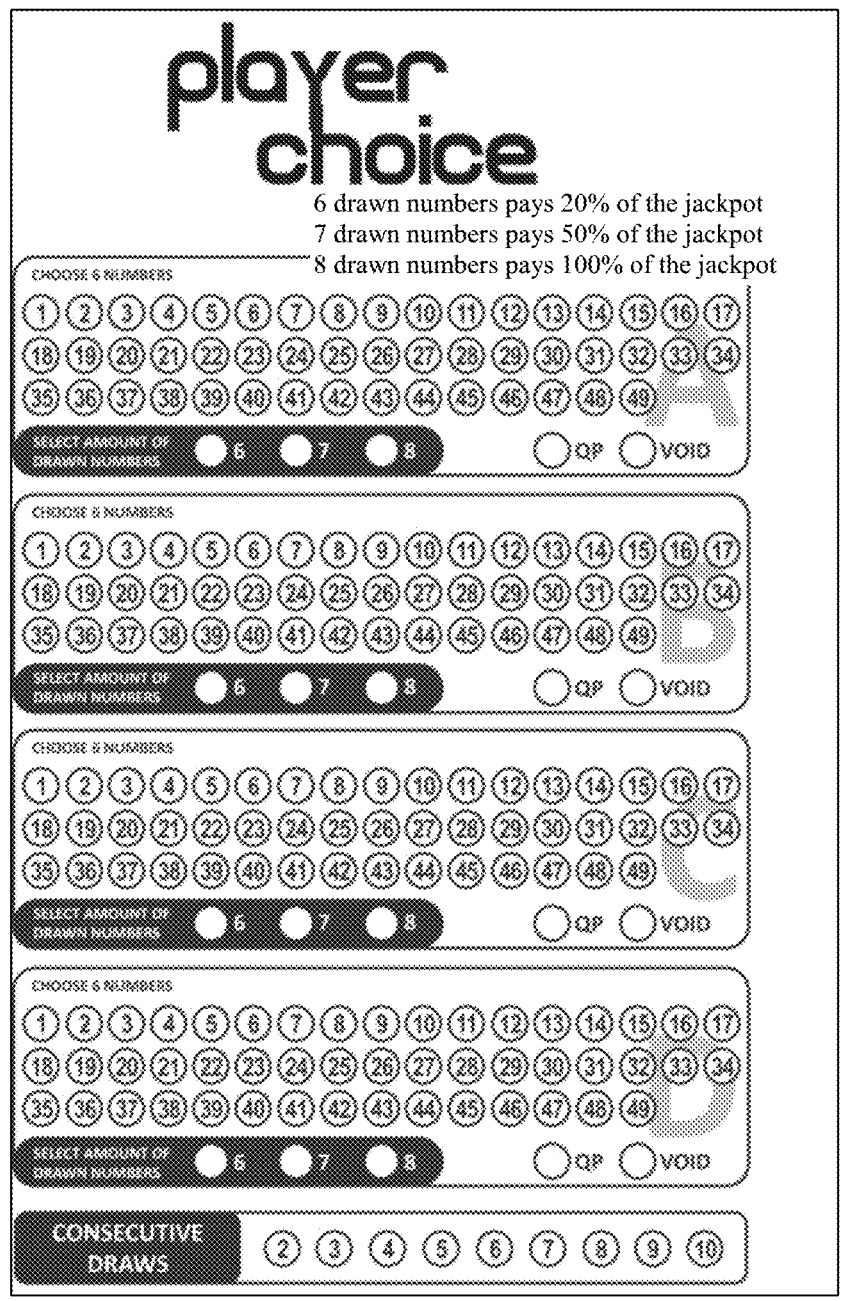

FIGS. 15A and 15B illustrate indicative designs of playslips utilized for the embodiments of the present invention offering players a single price point and jackpot pool, and multiple game modes/matrices.

FIG. 16 illustrates embodiments of the present invention, showing an indicative prize structure designed with a single price point and multiple game modes/matrices, prize structures, and payout levels, offering a common jackpot pool.

Illustrative Operating Environments

FIG. 1 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates varies strategies for assessing the data, caching, searching, and database connection pooling. An example of the scalable architecture is an architecture that is capable of operating multiple servers.

In embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MIMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
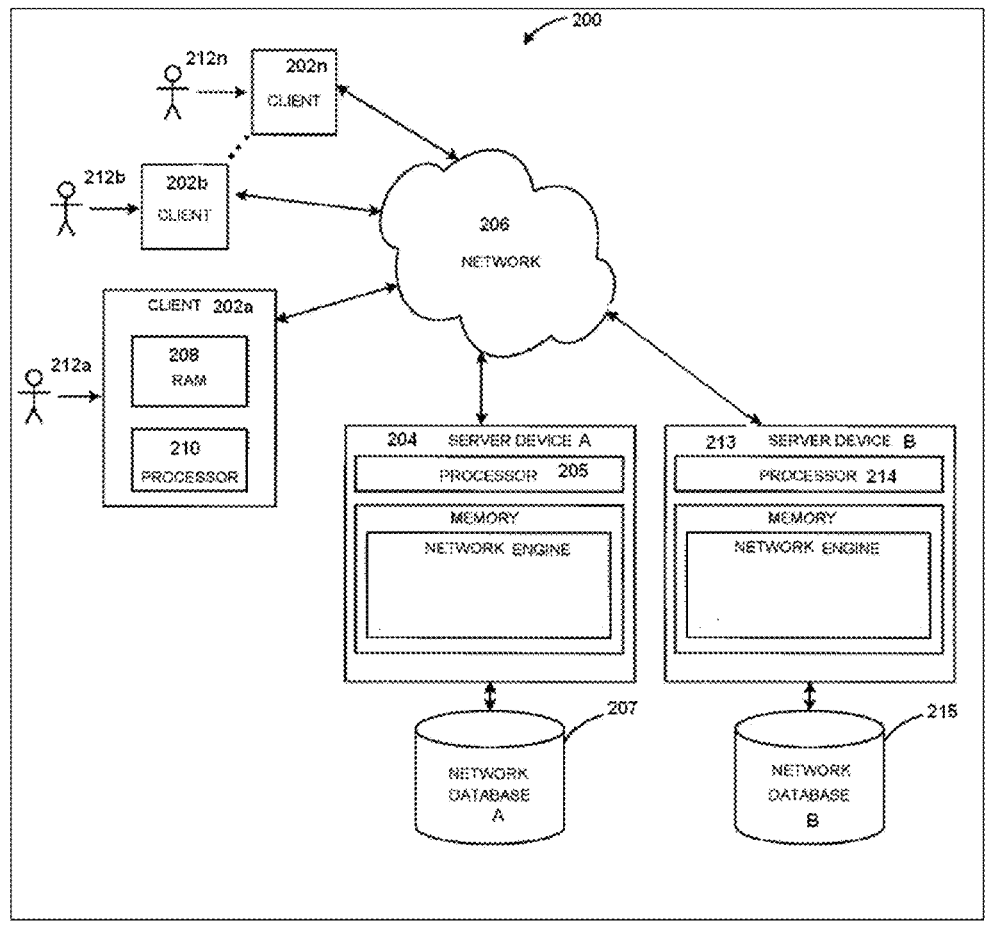

FIG. 2 shows another exemplary embodiment of the computer and network architecture that supports the methods and systems of the instant invention. In some embodiments, the member devices 202a, 202b thru 202n shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors comprise a microprocessor, an ASIC, and state machines. In some embodiments, uch processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users, 212a-n communicate over the network 206 with each other and with other systems and devices coupled to the network 206. As shown in FIG. 2, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 3:
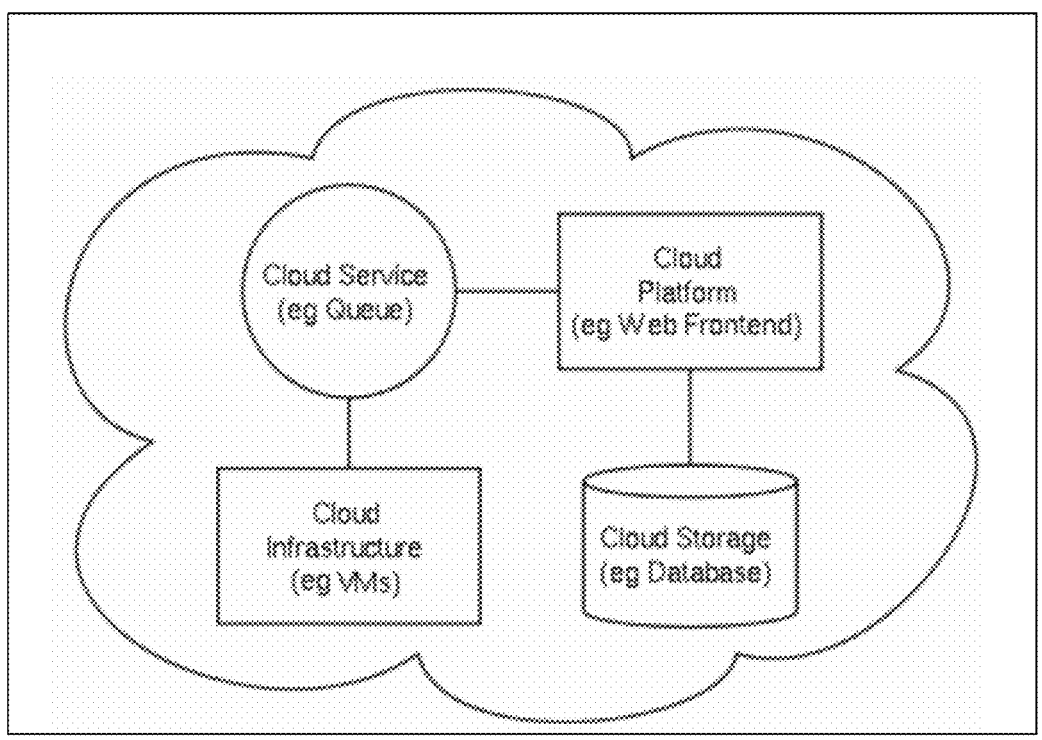
Figure 4:
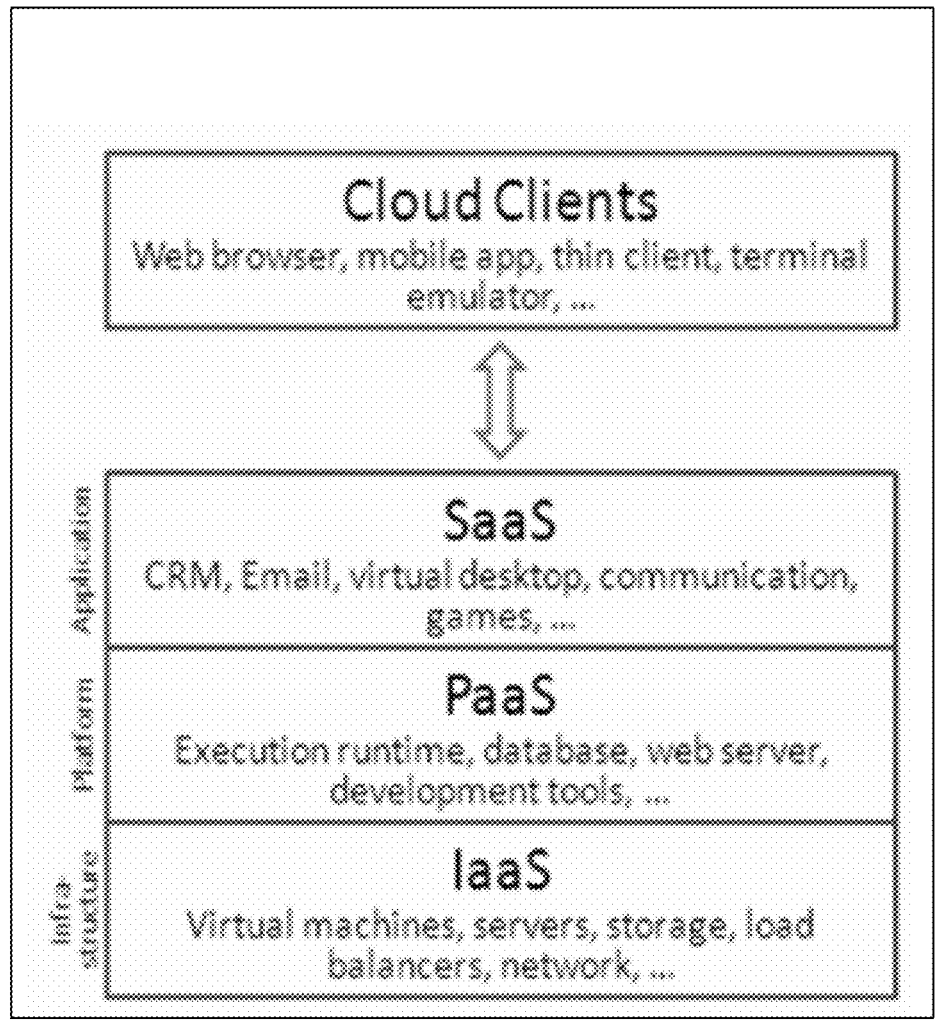

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive game-operating system offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the present invention provides for a specifically programmed game operating computer system, including at least the following components: at least one specialized computer machine, including at least the following components: a non-transient memory, electronically storing particular computer executable program code; and at least one computer processor which, when executing the particular program code, becomes a specifically programmed computer processor of the specifically programmed game operating computer system that is configured to concurrently perform in real-time at least the following operations for at least a thousand (1,000) of players: electronically receiving, by the at least one specialized computer machine, in real-time, via a computer network, game entries data representing game entries from the at least 1,000 players, where each game entry data includes: i) game mode data, identifying at least one first game being played, ii) at least one price point selection, identifying an amount spent to purchase such game entry, and iii) at least one game playing selection by a corresponding player; where the at least one first game: i) has a first common jackpot feature, 1) where the first common jackpot feature is configured to be calculated, in real-time during game entry submission, based on the at least one first game having a plurality of options within at least one of the following parameters: a) a price point per game entry, b) a payout level, c) a prize structure, d) a common jackpot contribution collection, and e) a prize distribution mechanism; or ii) is configured to share a second common jackpot feature with at least one second game, 1) where the second common jackpot feature is configured to be calculated, in real-time during game entry submission, based on the at least one first game and the at least one second game having the plurality of options within at least one of the following parameters respectively: a) the price point per game entry, b) the payout level, c) the prize structure, d) the common jackpot contribution collection, and e) the prize distribution mechanism; electronically calculating, by the at least one specialized computer machine, in real-time during each game entry submission: 1) portion weight contributions for allocating game entry amounts to operate the first common jackpot feature or the second common jackpot feature, where the calculating of the portion weight contributions is based, at least in part, on the plurality of options within at least one of the following parameters: a) the price point per game entry, b) the payout level, and c) the prize structure; and 2) an current estimated common jackpot amount; electronically allocating, by the at least one specialized computer machine, in real-time, the game entry amounts from the game entries of the at least 1,000 players to operate the first common jackpot feature or the second common jackpot feature; and electronically determining, by the at least one specialized computer machine, at least one game winner; and electronically generating, by the at least one specialized computer machine, at least one prize distribution, comprising a common jackpot prize distribution based on the operation of the first common jackpot feature or the second common jackpot feature.

In some embodiments, the at least one first game is a first lottery game. In some embodiments, the at least one second game is a second lottery game. In some embodiments, the at least one game playing selection is: 1) randomly generated by a lottery terminal, or 2) electronically acquired from a lottery paper slip or a digital input submitted by such player via a specialized graphical user interface specifically programmed for the at least one first game. In some embodiments, the price point per game entry has at least two options which each player can select from. In some embodiments, the payout level has at least two options which each player can select from. In some embodiments, the prize structure parameter has at least two options which each player can select from.

In some embodiments, the present invention provides for a computer-implemented method, including at least the steps of: electronically receiving, by at least one specifically programmed computer processor, via a computer network, in real-time, game entries data representing game entries from at least a thousand (1,000) of players, where each game entry data includes: i) game mode data, identifying at least one first game being played, ii) at least one price point selection, identifying an amount spent to purchase such game entry, and iii) at least one game playing selection by a corresponding player; where the at least one first game: i) has a first common jackpot feature, 1) where the first common jackpot feature is configured to be calculated, in real-time during game entry submission, based on the at least one first game having a plurality of options within at least one of the following parameters: a) a price point per game entry, b) a payout level, c) a prize structure, d) a common jackpot contribution collection, and e) a prize distribution mechanism; or ii) is configured to share a second common jackpot feature with at least one second game, 1) where the second common jackpot feature is configured to be calculated, in real-time during game entry submission, based on the at least one first game and the at least one second game having the plurality of options within at least one of the following parameters respectively: a) the price point per game entry, b) the payout level, c) the prize structure, d) the common jackpot contribution collection, and e) the prize distribution mechanism; electronically calculating, by the at least one specifically programmed computer processor, in real-time during each game entry submission: 1) portion weight contributions for allocating game entry amounts to operate the first common jackpot feature or the second common jackpot feature, where the calculating of the portion weight contributions is based, at least in part, on the plurality of options within at least one of the following parameters: a) the price point per game entry, b) the payout level, and c) the prize structure; and 2) an current estimated common jackpot amount; electronically allocating, by the at least one specifically programmed computer processor, in real-time, the game entry amounts from the game entries of the at least 1,000 players to operate the first common jackpot feature or the second common jackpot feature; and electronically determining, by the at least one specifically programmed computer processor, at least one game winner; and electronically generating, by the at least one specifically programmed computer processor, at least one prize distribution, comprising a common jackpot prize distribution based on the operation of the first common jackpot feature or the second common jackpot feature.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:
1. A specifically programmed game operating computer system, comprising:
at least one specialized computer gaming machine, comprising:
a non-transient memory, electronically storing particular computer executable program code; and at least one computer processor which, when executing the particular program code, becomes a specifically programmed computer processor of the specifically programmed game operating computer system that is configured to concurrently perform in real-time at least the following operations for at least a thousand (1,000) of players:

dynamically receiving, by the at least one specialized computer gaming machine, in real-time, via a computer network, game entries data representing game entries from the at least 1,000 players, wherein each game entry data comprises:
  i) game mode data, identifying at least one first game being played,
  ii) at least one price point selection, identifying an amount spent to purchase such game entry, and
  iii) at least one game playing selection by a corresponding player;

wherein the at least one first game:
  i) has a first common jackpot feature,
    wherein the first common jackpot feature is configured to be calculated, in real-time during game entry submission, based on the at least one first game having a plurality of options within at least one of the following parameters:
      a) a price point per game entry,
      b) a payout level,
      c) a prize structure,
      d) a common jackpot contribution collection, and
      e) a prize distribution mechanism; or
  ii) is configured to share a second common jackpot feature with at least one second game,
    wherein the second common jackpot feature is configured to be calculated, in real-time during game entry submission, based on the at least one first game and the at least one second game having the plurality of options within at least one of the following parameters respectively:
      a) the price point per game entry,
      b) the payout level,
      c) the prize structure,
      d) the common jackpot contribution collection, and
      e) the prize distribution mechanism;

dynamically calculating, by the at least one specialized computer gaming machine, in real-time during each game entry submission:
  1) portion weight contributions for allocating game entry amounts to operate the first common jackpot feature or the second common jackpot feature,
    wherein the calculating of the portion weight contributions is based, at least in part, on the plurality of options within at least one of the following parameters:
      a) the price point per game entry,
      b) the payout level, and
      c) the prize structure; and
  2) a current estimated common jackpot amount;

dynamically allocating, by the at least one specialized computer gaming machine, in real-time, the game entry amounts from the game entries of the at least 1,000 players to operate the first common jackpot feature or the second common jackpot feature;

dynamically determining, by the at least one specialized computer gaming machine, at least one game winner; and dynamically generating, by the at least one specialized computer gaming machine, at least one prize distribution, comprising a common jackpot prize distribution based on the operation of the first common jackpot feature or the second common jackpot feature.

2. The specifically programmed game operating computer system of claim 1, wherein the at least one first game is a first lottery game.

3. The specifically programmed game operating computer system of claim 2, wherein the at least one second game is a second lottery game.

4. The specifically programmed game operating computer system of claim 2, wherein the at least one game playing selection is:
  1) randomly generated by a lottery terminal, or
  2) electronically acquired from a lottery paper slip or a digital input submitted by such player via a specialized graphical user interface specifically programmed for the at least one first game.

5. The specifically programmed game operating computer system of claim 1, wherein the price point per game entry has at least two options which each player can select from.

6. The specifically programmed game operating computer system of claim 1, wherein the payout level has at least two options which each player can select from.

7. The specifically programmed game operating computer system of claim 1, wherein the prize structure parameter has at least two options which each player can select from.

8. A computer-implemented method, comprising:
dynamically receiving, by at least one specifically programmed computer gaming processor, via a computer network, in real-time, game entries data representing game entries from at least a thousand (1,000) of players, wherein each game entry data comprises:
  i) game mode data, identifying at least one first game being played,
  ii) at least one price point selection, identifying an amount spent to purchase such game entry, and
  iii) at least one game playing selection by a corresponding player;

wherein the at least one first game:
  i) has a first common jackpot feature,
    wherein the first common jackpot feature is configured to be calculated, in real-time during game entry submission, based on the at least one first game having a plurality of options within at least one of the following parameters:
      a) a price point per game entry,
      b) a payout level,
      c) a prize structure,
      d) a common jackpot contribution collection, and
      e) a prize distribution mechanism; or
  ii) is configured to share a second common jackpot feature with at least one second game,
    wherein the second common jackpot feature is configured to be calculated, in real-time during game entry submission, based on the at least one first game and the at least one second game having the plurality of options within at least one of the following parameters respectively:
      a) the price point per game entry,
      b) the payout level,
      c) the prize structure, d) the common jackpot contribution collection, and
e) the prize distribution mechanism;

dynamically calculating, by the at least one specifically programmed computer gaming processor, in real-time during each game entry submission:
1) portion weight contributions for allocating game entry amounts to operate the first common jackpot feature or the second common jackpot feature,
    wherein the calculating of the portion weight contributions is based, at least in part, on the plurality of options within at least one of the following parameters:
    a) the price point per game entry,
    b) the payout level, and
    c) the prize structure; and
2) a current estimated common jackpot amount;

dynamically allocating, by the at least one specifically programmed computer gaming processor, in real-time, the game entry amounts from the game entries of the at least 1,000 players to operate the first common jackpot feature or the second common jackpot feature;

dynamically determining, by the at least one specifically programmed computer gaming processor, at least one game winner; and dynamically generating, by the at least one specifically programmed computer gaming processor, at least one prize distribution, comprising a common jackpot prize distribution based on the operation of the first common jackpot feature or the second common jackpot feature.

9. The method of claim 8, wherein the at least one first game is a first lottery game.

10. The method of claim 9, wherein the at least one second game is a second lottery game.

11. The method of claim 9, wherein the at least one game playing selection is:
1) randomly generated by a lottery terminal, or
2) electronically acquired from a lottery paper slip or a digital input submitted by such player via a specialized graphical user interface specifically programmed for the at least one first game.

12. The method of claim 8, wherein the price point per game entry has at least two options which each player can select from.

13. The method of claim 8, wherein the payout level has at least two options which each player can select from.

14. The method of claim 8, wherein the prize structure parameter has at least two options which each player can select from.

* * * * *